United States Patent
Jakobsson

(10) Patent No.: US 11,075,899 B2
(45) Date of Patent: Jul. 27, 2021

(54) CLOUD AUTHENTICATION

(71) Applicant: Raven White Security, Inc., Menlo Park, CA (US)

(72) Inventor: Bjorn Markus Jakobsson, Portola Valley, CA (US)

(73) Assignee: RavenWhite Security, Inc., Menlo Park, CA (US)

( * ) Notice: Subject to any disclaimer, the term of this patent is extended or adjusted under 35 U.S.C. 154(b) by 270 days.

(21) Appl. No.: 16/394,279

(22) Filed: Apr. 25, 2019

(65) Prior Publication Data

US 2019/0281042 A1    Sep. 12, 2019

Related U.S. Application Data

(63) Continuation of application No. 14/736,156, filed on Jun. 10, 2015, now Pat. No. 10,348,720, which is a
(Continued)

(51) Int. Cl.
*H04L 29/06* (2006.01)
*G06F 21/55* (2013.01)
(Continued)

(52) U.S. Cl.
CPC .......... *H04L 63/083* (2013.01); *G06F 21/31* (2013.01); *G06F 21/552* (2013.01); *G06F 21/60* (2013.01); *H04L 9/0891* (2013.01); *H04L 63/1483* (2013.01); *G06F 2221/2131* (2013.01); *H04K 1/00* (2013.01); *H04L 2209/56* (2013.01); *H04L 2209/605* (2013.01); *H04L 2209/805* (2013.01); *H04W 4/02* (2013.01)

(58) Field of Classification Search
CPC . H04L 63/083; H04L 9/0891; H04L 63/1483; H04L 2209/56; H04L 2209/605; H04L 2209/805; H04L 63/20; H04L 63/1416; G06F 21/552; G06F 21/60; G06F 21/31; G06F 2221/2131; H04W 4/02; H04K 1/00
See application file for complete search history.

(56) References Cited

U.S. PATENT DOCUMENTS 5,704,017 A     12/1997   Heckerman
5,721,781 A *   2/1998    Deo ................... G06Q 20/341
                                                    705/67
(Continued)

FOREIGN PATENT DOCUMENTS

WO     WO-03034633 A2 *  4/2003   ............. G07C 9/33

OTHER PUBLICATIONS

Agrawal et al., Privacy-Preserving Data Mining, ACM SIGMOD Conference on Management of Data (2000), ACM Press, pp. 439-450.
(Continued)

*Primary Examiner* — John B King
(74) *Attorney, Agent, or Firm* — Van Pelt, Yi & James LLP

(57) ABSTRACT

A cloud authentication system is disclosed. A request for an authentication setup for a first user of a first service provider is received. Additional information, such as authentication criteria, can further be received, such as from the first service provider. A set of stimuli to associate with a first user profile of the first user of the first service provider is stored.

21 Claims, 11 Drawing Sheets

Related U.S. Application Data continuation of application No. 13/370,078, filed on Feb. 9, 2012, now Pat. No. 9,195,834, which is a continuation-in-part of application No. 12/215,048, filed on Jun. 23, 2008, now Pat. No. 8,844,003, which is a continuation-in-part of application No. 11/890,408, filed on Aug. 6, 2007, now abandoned, said application No. 13/370,078 is a continuation-in-part of application No. 13/161,184, filed on Jun. 15, 2011, now Pat. No. 9,432,199.

(60) Provisional application No. 61/441,562, filed on Feb. 10, 2011, provisional application No. 60/967,675, filed on Sep. 6, 2007, provisional application No. 60/918,781, filed on Mar. 19, 2007, provisional application No. 60/836,641, filed on Aug. 9, 2006, provisional application No. 61/355,149, filed on Jun. 16, 2010.

(51) Int. Cl.
*G06F 21/60* (2013.01)
*H04L 9/08* (2006.01)
*G06F 21/31* (2013.01)
*H04W 4/02* (2018.01)
*H04K 1/00* (2006.01)

(56) References Cited

U.S. PATENT DOCUMENTS

| | | | |
|---|---|---|---|
| 5,978,475 A | 11/1999 | Schneier | |
| 5,991,882 A | 11/1999 | O'Connell | |
| 6,035,406 A | 3/2000 | Moussa | |
| 6,108,706 A | 8/2000 | Birdwell | |
| 6,385,596 B1 | 5/2002 | Wiser | |
| 6,421,453 B1 | 7/2002 | Kanevsky | |
| 6,496,936 B1 | 12/2002 | French | |
| 6,766,319 B1 | 7/2004 | Might | |
| 6,965,948 B1 | 11/2005 | Eneborg | |
| 7,024,690 B1 | 4/2006 | Young | |
| 7,095,850 B1 | 8/2006 | McGrew | |
| 7,152,165 B1 | 12/2006 | Maheshwari | |
| 7,310,733 B1 | 12/2007 | Pearson | |
| 7,509,290 B1 | 3/2009 | McKee | |
| 7,698,442 B1 | 4/2010 | Krishnamurthy | |
| 7,792,738 B2 | 9/2010 | Channell | |
| 7,800,534 B1 | 9/2010 | Yenney | |
| 7,861,287 B2 | 12/2010 | Pomerantz | |
| 7,930,735 B2 | 4/2011 | Vigelette | |
| 7,979,908 B2* | 7/2011 | Millwee | G06F 21/645 726/26 |
| 8,069,484 B2 | 11/2011 | McMillan | |
| 8,078,881 B1 | 12/2011 | Liu | |
| 8,086,533 B1 | 12/2011 | Maglaque | |
| 8,102,253 B1 | 1/2012 | Brady, Jr. | |
| 8,453,222 B1 | 5/2013 | Newstadt | |
| 8,869,243 B2 | 10/2014 | McGeehan | |
| 2002/0026345 A1 | 2/2002 | Juels | |
| 2002/0031230 A1 | 3/2002 | Sweet | |
| 2002/0062268 A1 | 5/2002 | Sato | |
| 2002/0169865 A1 | 11/2002 | Tarnoff | |
| 2003/0131256 A1 | 7/2003 | Ackroyd | |
| 2003/0145224 A1 | 7/2003 | Bailey | |
| 2003/0154406 A1 | 8/2003 | Honarvar | |
| 2003/0194094 A1 | 10/2003 | Lampson | |
| 2003/0212800 A1 | 11/2003 | Jones | |
| 2003/0225707 A1* | 12/2003 | Ehrman | G06Q 10/087 705/64 |
| 2003/0236992 A1 | 12/2003 | Yami | |
| 2004/0083390 A1 | 4/2004 | Cuenod | |
| 2004/0111621 A1 | 6/2004 | Himberger | |
| 2004/0123116 A1 | 6/2004 | Jin | |
| 2004/0123162 A1 | 6/2004 | Antell | |
| 2004/0186813 A1 | 9/2004 | Tedesco | |
| 2004/0189441 A1 | 9/2004 | Stergiou | |
| 2004/0255150 A1 | 12/2004 | Sezan | |
| 2005/0076384 A1 | 4/2005 | Upendran | |
| 2005/0097320 A1 | 5/2005 | Golan | |
| 2005/0097364 A1* | 5/2005 | Edeki | G06F 21/552 726/4 |
| 2005/0128989 A1 | 6/2005 | Bhagwat | |
| 2005/0166065 A1 | 7/2005 | Eytchison | |
| 2006/0036857 A1 | 2/2006 | Hwang | |
| 2006/0123092 A1 | 6/2006 | Madams | |
| 2006/0123478 A1 | 6/2006 | Rehfuss | |
| 2006/0178918 A1 | 8/2006 | Mikurak | |
| 2006/0225136 A1 | 10/2006 | Rounthwaite | |
| 2006/0235764 A1 | 10/2006 | Bamborough | |
| 2006/0258368 A1 | 11/2006 | Granito | |
| 2006/0282660 A1 | 12/2006 | Varghese | |
| 2006/0293921 A1 | 12/2006 | McCarthy | |
| 2007/0005967 A1 | 1/2007 | Mister | |
| 2007/0016951 A1 | 1/2007 | Piccard | |
| 2007/0022300 A1* | 1/2007 | Eppert | H04L 63/08 713/183 |
| 2007/0039038 A1 | 2/2007 | Goodman | |
| 2007/0081667 A1 | 4/2007 | Hwang | |
| 2007/0179848 A1 | 8/2007 | Jain | |
| 2007/0261109 A1 | 11/2007 | Renaud | |
| 2007/0277224 A1 | 11/2007 | Osborn | |
| 2009/0055910 A1 | 2/2009 | Lee | |
| 2009/0094164 A1 | 4/2009 | Fontaine | |
| 2009/0119763 A1 | 5/2009 | Park | |
| 2009/0150986 A1 | 6/2009 | Foreman | |
| 2009/0245572 A1* | 10/2009 | Tsao | G06F 3/011 382/103 |
| 2009/0254572 A1 | 10/2009 | Redlich | |
| 2009/0254971 A1* | 10/2009 | Herz | G06Q 30/0603 726/1 |
| 2009/0319274 A1 | 12/2009 | Gross | |
| 2010/0030578 A1 | 2/2010 | Siddique | |
| 2010/0031330 A1 | 2/2010 | Von Ahn | |
| 2010/0122341 A1 | 5/2010 | Golle | |
| 2012/0011567 A1 | 1/2012 | Cronk | |
| 2013/0117813 A1* | 5/2013 | Yudkin | H04L 9/3226 726/2 |

OTHER PUBLICATIONS

Andrew Clover, Timing Attacks on Web Privacy (Paper and Specific Issue), Feb. 20, 2002, http://www.securiteam.com/securityreviews/5GP020A6LG.html, downloaded on Oct. 9, 2006.

Author Unknown, ActiveX Spyware & Adware Scanning, SpywareInfo > Online Spyware Detection, http://www.spywareinfo.com/xscan.php, downloaded Oct. 9, 2006.

B. Schneier, et al., 'Cryptographic Support for Secure Logs on Untrusted Machine', In USENIX Security Symposium, pp. 53-62, 1998.

B. Schneier, et al., 'Secure Audit Logs to Support Computer Forensics', ACM Transactions on Information and System Security (TISSEC), 2(2), pp. 159-176. May 1999.

Bellare et al., Forward Integrity for Secure Audit Logs, Technical Report, University of California of San Diego, Dept. of Computer Science & Engineer., pp. 1-16, Nov. 23, 1997.

C. Guther, et al., 'An Identity-Based Key-Exchange Protocol', Downloaded on Oct. 9, 2007 from http://dsns.csie.nctu.edu.tw/research/crypto/HTML/PDF/E89/29.PDF.

Felten, E.W. et al., 'Timing Attacks on Web Privacy', ACM Conference on Computer and Communication Security (2000), ACM Press, pp. 25-32.

H. Jin, et al., 'Key Evolution-Based Tamper Resistance: A Subgroup Extension', in R.H. Deng and P. Samarati, editors, ACM ASIACCS, 2007.

H., Jin, et al., 'Towards Better Software Tamper Resistance', in J. Zhou et al., editor, Information Security Conference, Springer, LNCS 3650, 3650, pp. 417-430, 2005.

M. Bellare, et al., 'Forward-Security in Private-Key Cryptography', in CT-RSA, Springer-Verlag, LNCS No. 2612, pp. 1-18, 2003.

(56) References Cited

OTHER PUBLICATIONS

W. Diffie, et al., 'Authentication and Authenticated Key Exchanges', Designs, Codes and Cryptography, 2, pp. 107-125, 1992.
Ariel Rabkin, Personal Knowledge Questions for Fallback Authentication: Security Questions in the Era of Facebook, Symposium on Usable Privacy and Security (SOUPS), 2008.

* cited by examiner

|          | Like | Dislike | No Opinion |
|----------|------|---------|------------|
| horses   | 20%  | 10%     | 70%        |
| bingo    | 01%  | 90%     | 09%        |
| skydiving| 50%  | 50%     | 00%        |
| bookstore| 40%  | 50%     | 10%        |

502 (rows), 504 (columns)

FIG. 5

Knowledge: User is 20-25 years old and likely male. (E.g., Obtained from existing profile.) ~602

Ask question: Are you male or female? ~606
User selects: Male.
Knowledge: User is likely to be 20-25 years old, is male.

Ask question: Did you play football in high school? ~610
User selects: Yes. ~614
Knowledge: User is active, likely to be 20-25 years old, is male, may be interested in thrilling activities. ~616

Ask question: Would you ever skydive? ~622
User selects: No ~624
Knowledge: User is active, likely to be 20-25 years old, is male, is likely not interested in thrilling activities. ~626

Select stimuli: No extreme sports, Several active sports, No cooking, No bingo, Travel.

FIG. 6A

Knowledge: User is 20-25 years old and likely male. (E.g., Obtained from existing profile.) ~604

Ask question: Are you male or female? ~608
User selects: Male.
Knowledge: User is likely to be 20-25 years old, is male.

Ask question: Did you play football in high school? ~612
User selects: No. ~618
Knowledge: User is low-to-medium active, likely to be 20-25 years old, is male, is likely not interested in thrilling activities. ~620

Ask question: Have you ever snorkled?
User selects: Yes
Knowledge: User is active, likely to be 20-25 years old, is male, is likely not interested in thrilling activities, likes nature with a high probability, is probably not a vegetarian, and has a 72% likelihood of listening to NPR.

Select stimuli: No extreme sports, Several active sports, Travel, College. ~628

FIG. 6B

01. Do you think Joe Smith is funny? — 802   Yes [X]   No [ ]   Not Sure [ ]

02. Do you like anchovies? — 804   [ ]   [X]   [ ]

03. Have you ever played golf? — 806   [ ]   [ ]   [X]

...

20. Have you been to Chicago? — 808   [ ]   [X]   [ ]

FIG. 8A

On a scale of 1 (strongly disagree) – 5 (strongly agree), please rate the following statements:   1   2   3   4   5

01. I have watched many horror movies   O O O O O

02. Classic literature is boring   O O O O O

03. Swimming in a lake is gross   O O O O O

Please type in at least 10 items in each column

Products I Routinely Buy
   ACME Paper Towels
   eggs
   BETA Bread
   ...

Products I Never Buy
   Dog food
   Canned tuna
   Gamma Soda
   Bottled water

Select at least ten items that best describe your childhood:

904

| | | | | |
|---|---|---|---|---|
| lonely | <u>active</u> | soccer | sad | parties |
| moving | vacation | camping | tv | <u>dogs</u> |
| fishing | city | study | mom | dad |
| grandma | Nevada | Paris | games | beach |
| horses | volleyball | pink | prom | marching band |
| good grades | hated math | brother | sister | acne |

*You have selected 2.* Click <u>here</u> for additional words.

902

Done

Confirm your identity by selecting at least five items that best describe your childhood:

| | | | | |
|---|---|---|---|---|
| girls | piano | <u>active</u> | moving | sad |
| cats | moving | vacation | camping | tv |
| fishing | crowded | study | mom | dad |
| grandma | beach | Paris | games | skiing |
| horses | volleyball | pink | prom | marching band |
| good grades | hated math | conflict | sister | acne |

*You have selected 1.* Click <u>here</u> for additional words.

Done

FIG. 9B

CLOUD AUTHENTICATION

CROSS REFERENCE TO OTHER APPLICATIONS

This application is a continuation of U.S. patent application Ser. No. 14/736,156, entitled CLOUD AUTHENTICATION filed Jun. 10, 2015 which is incorporated herein by reference for all purposes, which is a continuation of U.S. patent application Ser. No. 13/370,078, entitled CLOUD AUTHENTICATION filed Feb. 9, 2012, now U.S. Pat. No. 9,195,834 which is incorporated herein by reference for all purposes, which claims priority to U.S. Provisional Application No. 61/441,562, entitled PREFERENCE-BASED AUTHENTICATION IN THE CLOUD filed Feb. 10, 2011 which is incorporated herein by reference for all purposes.

U.S. patent application Ser. No. 13/370,078, is a continuation in part of U.S. patent application Ser. No. 12/215,048, entitled PERFORMING AUTHENTICATION filed Jun. 23, 2008 now U.S. Pat. No. 8,844,003, which is incorporated herein by reference for all purposes, which claims priority to U.S. Provisional Application No. 60/967,675, entitled METHOD AND APPARATUS FOR LIGHT-WEIGHT AUTHENTICATION filed Sep. 6, 2007 which is incorporated herein by reference for all purposes.

U.S. patent application Ser. No. 12/215,048, is a continuation in part of U.S. patent application Ser. No. 11/890,408, entitled METHOD AND APPARATUS FOR EVALUATING ACTIONS PERFORMED ON A CLIENT DEVICE filed Aug. 6, 2007 which is incorporated herein by reference for all purposes, which claims priority to U.S. Provisional Application No. 60/918,781, entitled SECURE LOGGING OF CRITICAL EVENTS, ALLOWING EXTERNAL MONITORING filed Mar. 19, 2007 and to U.S. Provisional Application No. 60/836,641, entitled METHOD AND APPARATUS FOR IMPROVED WEB SECURITY filed Aug. 9, 2006, which both are incorporated herein by reference for all purposes.

U.S. patent application Ser. No. 13/370,078, is a continuation in part of U.S. patent application Ser. No. 13/161,184, entitled SYSTEM ACCESS DETERMINATION BASED ON CLASSIFICATION OF STIMULI filed Jun. 15, 2011, now U.S. Pat. No. 9,432,199, which is incorporated herein by reference for all purposes, which claims priority to U.S. Provisional Application No. 61/355,149, entitled SYSTEM ACCESS DETERMINATION BASED ON CLASSIFICATION OF STIMULI filed Jun. 16, 2010 which is incorporated herein by reference for all purposes.

BACKGROUND OF THE INVENTION

Authentication techniques are used to ensure that actions, for example accessing a computer or other resource, are performed only by an authorized human or other user. One way that websites and other electronic services authenticate their users is by requiring those users to supply a username and a valid password before being granted access. Typically the password is selected by the user the first time the user visits the site (e.g., as part of a registration process), and may be changed by the user as desired. Unfortunately, users sometimes forget their passwords—especially if the password is complex or used infrequently. Passwords can also be difficult to type, for example if the user is using a client with limited input capabilities. Passwords are also subject to compromise by nefarious individuals, such as through guessing, insecure storage by the website/service, and attacks against the user, such as through keystroke logging. Therefore, even when a service provider observes a valid password being entered, there is a risk that the password has been stolen and is being entered by an attacker. Further, in some circumstances devices are linked with user accounts, and allow access to the account to anyone with access to the device, increasing the risk of unauthorized use of devices, whether by a person or a virus.

BRIEF DESCRIPTION OF THE DRAWINGS

Various embodiments of the invention are disclosed in the following detailed description and the accompanying drawings.

FIG. 5 is a chart depicting a set of probabilities for various categories of stimuli with respect to a profile.

FIG. 6A illustrates a set of questions and answers usable to select a set of stimuli.

FIG. 6B illustrates a set of questions and answers usable to select a set of stimuli.

FIG. 8A illustrates an embodiment of an interface for capturing classification information.

FIG. 8B illustrates an embodiment of an interface for capturing classification information.

FIG. 8C illustrates an embodiment of an interface for capturing classification information.

FIG. 9A illustrates an embodiment of an interface for capturing classification information.

FIG. 9B illustrates an embodiment of an interface for capturing classification information to authenticate a user.

DETAILED DESCRIPTION

Figure 1:
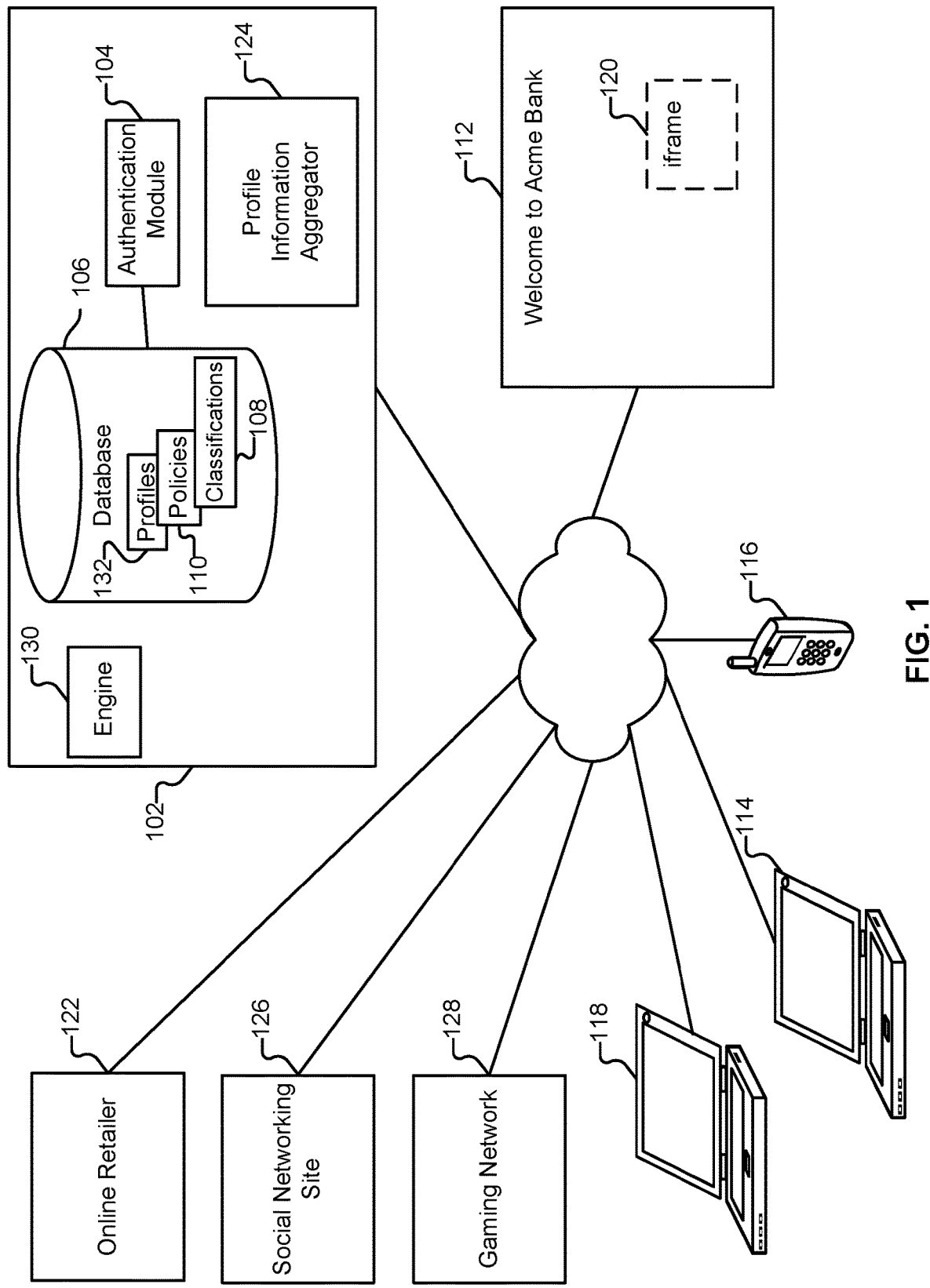
FIG. 1 illustrates an embodiment of an environment in which authentication is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

Those who control access to computer or other resources commonly use automated techniques to verify the identity of a person or other user attempting to take an action with respect to the resource, such as accessing account or other information, completing a purchase, transferring money, or other transactions. If a user is unable to remember his or her password, that user typically can request that the password be reset via an automated process by which the identity of the user is attempted to be verified. Assorted schemes exist that attempt to determine whether a particular reset request has been submitted by a legitimate user that has genuinely forgotten his or her password or by a nefarious individual attempting to gain unauthorized access to an account. Unfortunately, some such schemes can be vulnerable to datamining (e.g., asking for a mother's maiden name or county in which the user owns property, both of which can be obtained from public records). Other schemes can be vulnerable to guessing (e.g., requiring the user to supply answers to a series of questions at enrollment time such as "what is the name of your pet?" for which there are common responses). If questions attempting to elicit less common responses are used (e.g., "what is the name of your grade school teacher?"), a risk exists that a legitimate user will, in addition to forgetting the password, also forget the information needed to complete a password reset action. Other schemes, such as requiring that the user call a help desk for assistance can be expensive and can also be subject to social engineering on the part of an attacker. If the user maintains a personal website or makes use of social networking sites, an attacker potentially has even more information to mine (e.g., for names of pets, names of friends, former addresses, etc.) and thus may have an even easier time gaining unauthorized access to the legitimate user's account.

Described herein are embodiments of an authentication system (also referred to herein as a "cloud authentication system") that provides authentication services on behalf of a variety of service providers. As one example, a bank, "Acme Bank" is a service provider that has contracted with the owner of the authentication system to provide authentication services. Using the techniques described herein, users of Acme Bank's web site can be presented (e.g., via an iframe) with an interface that is usable both to collect information from a legitimate user during a learning phase (e.g., occurring in conjunction with and/or prior to the initial registration by the legitimate user) and challenge the user during a proof phase (e.g., occurring in conjunction with an attempt to authenticate the user on a subsequent visit). In some embodiments, during the learning phase, various stimuli likely to be of interest to the user are determined and presented to the user for classification. For example, the user is asked to classify various activities as being "scary" or not. As another example, the user is asked to designate whether the user has visited various locations in his or her lifetime.

In some embodiments, sets of stimuli are selected by the cloud authentication system (or by the service provider, or by both working in cooperation) for being collectively unlikely to become classified differently over time by a given person, and also for having sufficient entropy such that legitimate users will be able to successfully provide authenticating information and imposters will be unable to do so.

The following is a list of example types of "stimuli" for which a user can be prompted to supply a classification. The list is not exhaustive, but provided to illustrate various kinds of information that are representative of the stimuli described herein:

(a) images of people, events, locations, food dishes, commercials, full-length movie posters, activities, animals, and other objects;

(b) movie clips excerpted from music videos, animations, commercials, full-length movies, activities, and other subjects;

(c) sounds corresponding to activities, locations, songs, movies, famous personalities, animals, and other sources of audio;

(d) interactive environments, such as games and role playing situations; and (e) other appropriate sensory information, such as information based on vibrations, mimicking activities, and events.

The following is a list of example classification rules a user can be prompted to apply to the stimuli:

(a) this is funny/not funny;
(b) this is scary/not scary;
(c) this is interesting/not interesting;
(d) this is good/bad;
(e) I do this often/I hardly ever do this;
(f) I wish I could do this/I do not have any wish to do this;
(g) I have done this/I have not done this;
(h) I like this/I do not like this;
(i) I know about this/I do not know about this;
(j) I have owned this/I have not owned this;
(k) I want this/I do not want this;
(l) I have seen this image before/I have not seen this image before;
(m) I have heard this sound before/I have not heard this sound before;
(n) I agree with this statement/I do not agree with this statement;
(o) I drew this/I did not draw this;
(p) I took this photo/I did not take this photo; and
(q) I recognize this voice/I do not recognize this voice.

Classifications of stimuli in accordance with some of the above may be binary (e.g., "I have done this" vs. "I have not done this"). The non-selection by a user (e.g., leaving an item set by default to "no opinion" or "not applicable") can also be used to turn a binary classification into a ternary one, described in more detail below. Other classifications can have a wider gradation, such as where a user is asked to what degree he agrees with a Likert item (e.g., "I strongly agree," "I mildly agree," "I am neutral," "I mildly disagree," and "I strongly disagree"). In some embodiments the user is asked to perform a selection of more and less important events. The following question is an example of that type: "Among the following sports, which one(s) do you prefer watching: auto racing, baseball, basketball, bowling, cricket, football, golf, hockey, soccer, ski jump, figure skating, tennis." A similar question can be posed to ask which ones the user does not like watching. Yet another example of a technique for collecting user classification information is to provide a question that permits several simultaneous correct entries.

For example, "Describe your personality by selecting one or more suitable descriptions: introvert, extrovert, peaceful, worrying, goal-oriented, impulsive, confrontational, shy, passionate." In this example, some of the terms are in contradiction to each other, such as "introvert" and "extrovert," while others are roughly synonymous, such as "introvert" and "shy."

In some embodiments the stimuli for which a user's classification is solicited (especially in the aggregate) have a "high entropy," meaning that given a random sample of individuals, it would be difficult to guess a particular individual's response for a particular item, whether statistically, or based on knowledge of basic demographic or other information about an individual that can readily be obtained (e.g., through data-mining of publicly available information). Examples of items with low entropy in their corresponding user classifications include stimulus such as "like vacation," "dislike pain," "own a car," "don't own a yacht," "have seen Robin Hood," and "haven't played the harp." Conversely, "like seafood," "have been to the opera," and "would like to ride in a hot air balloon" are examples of items with higher entropy. The higher entropy items are examples of stimulus for which a given user's opinions are unlikely to be guessed by a third party, but are also likely to be remembered by that user. As another example, the user can be shown, during the learning phase, one or more unique photographs (e.g., of a strange airplane) and during the proof phase presented with additional photos and asked to select which photograph(s) to which the user was previously exposed.

As will be described in more detail below, the cloud authentication system stores one or more profiles for an end user. The stored profile can include a variety of information known about the user, such as identifying information (e.g., a name or pseudonym, address, or phone number); demographic information; corresponding device information (e.g., an operating system specification, MAC address, or IMEI); and/or inferred preference information. In some embodiments, the profile is used to select which stimuli should be presented to the user for classification during the learning phase. For example, if a profile of the user indicates that the user watches television, classifications with respect to particular genres of television may be solicited, such as: reality shows, news, sports, sitcoms, dramas, movies, soap operas, game shows, and documentaries. Classifications with respect to specific shows and/or actors can also be solicited.

Also as will be described in more detail below, if a collection of users expresses interest for a specific activity in a statistical sense, then each member of the collection of users can be assumed to have an associated preference. This can be used to select what classifications to elicit. For example, if a collection of users joins a baseball discussion forum (e.g., at www.baseballchatter.com), then they are all likely to have opinions with respect to baseball, and statistically, by extension, spectator sports in general. It may also be known that users in such a group are commonly equally likely to be interested in skydiving as not being interested in skydiving, whereas a more general group of users may exhibit a much greater lack of interest for skydiving than an interest for the same. Therefore, if a user belongs to the baseball forum, it may be beneficial to solicit categorization information from forum users regarding skydiving interests, since this answer is largely unpredictable, and therefore hard for a knowledgeable attacker to anticipate. At the same time, questions such as whether the forum users like baseball, have ever played baseball, or have ever owned a baseball bat should and can be avoided because their answers are easy for a somewhat knowledgeable attacker to guess. In this example, the decisions of which classifications to solicit are based on the expected behavior of the collection of users to which a given user belongs—the particular interests of the specific user may be quite different from the group as a whole.

If a profile of the user indicates the user likes to eat food, classifications with respect to particular cuisines may be solicited, such as: American, Barbecue, Japanese/Sushi, Jewish/Kosher, Vegan, and Vietnamese. If the profile of the user indicates that the user enjoys cooking, various ingredients can be presented instead of/in addition to types of cuisine, such as "How frequently do you cook with curry powder," or "have you ever cooked a crème brulee."

If a profile of the user indicates the user likes music, the user may be further queried for preferences for or against particular genres of music (e.g., Acoustic, Alternative, Big Band/Swing, Blues, Christian & Gospel, Classic Rock n' Roll, Classical, Country, Dance/Electronica, Disco, . . . ). Based on the responses, sound clips can be played and the user asked whether or not the user likes the song, recognizes the song, recognizes the performer of the song, knows all the lyrics to the song, or any other applicable classification. As another example, at enrollment time, the user's preferences for certain genres of music can be collected, and later, during authentication, audio clips representative of those genres can be played back to the user, asking the user to confirm whether or not the user likes songs of the same genre (i.e., not necessarily asking the user whether the user likes a particular song).

In some cases, some classifications (e.g., "I like Italian food" and "I don't like onions") are observable, such as by family members and coworkers. Some classifications can also leave traces (e.g., a review of a movie or a product, or a discussion on a social networking site about hobbies or upcoming travel plans). However, very few third parties will be able to observe or guess a specific individual's classification of stimuli across multiple categories. For example, while a co-worker might observe a person's preference for Italian food, the co-worker is less likely to know that the person frequents comedy clubs, has never sung Karaoke, and reads romance novels (or all of that information collectively).

In some embodiments, when system 102 learns about a publicly expressed opinion of a user (such as through an online product review authored by the user), the system can prevent the inclusion of classifications relating to or correlated to this expressed opinion in the learning phase (if the user has not already provided such a classification) or the proof phase (if the user has already provided the classification), or to assign the classifications a lower weight as applicable. The system can also decide to include or not include stimuli for classification based on a perceived threat. For example, if the perceived threat is that a legitimate user is being impersonated by a piece of malware (which is assumed to be highly automated, but not well aware of the user's opinions), then the item may not be removed from the classification, and its weight may not be lowered. However, if the perceived threat is a family member attempting to access an account, an assumption can be made that personally expressed preferences (e.g., in the form of product reviews) may be fairly well known by the expected attacker, and therefore the item should either be removed or accorded a lower associated weight. Example ways of making a determination of what type of threat is most likely presented include reviewing the IP address of the access; the type of transaction requested; and recent fraudulent and legitimate activity (e.g., observed by a particular service provider and/or by system 102).

The techniques described herein can be used as a secondary form of authentication (e.g., for when the user has forgotten or is otherwise unable to supply an existing password) and can also be used as a primary form of authentication (e.g., instead of a traditional password, PIN, or other credential), as applicable. The techniques described herein can also be used for other purposes, such as risk mitigation (e.g., as an additional check prior to allowing a high value or otherwise suspicious transaction to be completed), the detection of malware, and other appropriate applications. Examples of such other appropriate applications are provided below.

Example Environment

FIG. 1 illustrates an embodiment of an environment in which authentication is provided. In the example shown, a user (hereinafter referred to as "Alice") purchases products from online retailer 122 and participates on social networking site 126. Another user (hereinafter referred to as "Bob") has an account with gaming network 128 and also has an account with online retailer 122.

Alice and Bob both bank with Acme Bank, which has typical branch offices and a website 112. Alice connects to website 112 (and services 122 and 126) using her laptop 114, and on occasion, also uses her mobile phone 116 to perform tasks such as checking her account balances with Acme Bank via an application installed on her phone. Bob similarly connects to sites 122, 128, and 112 with his laptop 118. In various embodiments, other types of clients (not shown) are used to communicate with website 112 (and/or other services mentioned herein), such as personal digital assistants, set-top boxes, game consoles, etc. In addition to (and/or instead of) websites, such as website 112, the techniques described herein may also be used in conjunction with other electronic environments, such as those providing authentication to intranet services, network appliances, mobile phone/tablet applications, game servers, etc.

In the example shown in FIG. 1, authentication module 104 is configured to capture information provided by users such as Alice (e.g., through iframe 120) and store that information in database 106, for example as a set 108 of classifications of stimuli associated with Alice. Database 106 also stores other information, such as representations of stimuli and policies 110 to be used by authentication module 104 when determining whether an entity purporting to be Alice should be granted access to resources. Other data structures may also be used to store classifications 108 and/or policies 110 as applicable.

In the example shown in FIG. 1, system 102 comprises standard commercially available server hardware (e.g., having a multi-core processor, 4G+ of RAM, and Gigabit network interface adaptors) running a typical server-class operating system (e.g., Linux). In various embodiments, system 102 is implemented across a scalable infrastructure comprising multiple such servers, solid state drives, and other applicable high-performance hardware. In various embodiments, the infrastructure provided by portions of authentication system 102 is located on and/or replicated across a plurality of servers rather than the entirety of authentication system 102 being collocated on a single platform. The operator of system 102 may also be distinct from the owner of the hardware on which the system runs. For example, system 102 can be implemented as a cloud-based service and run on infrastructure provided by a third party, such as Amazon Web Services or Go Grid. And, the operator of system 102 may also provide services of its own. For example, system 102 and website 122 may both be owned by the same entity. In such a scenario, system 102 would provide authentication services to website 122 in the manner described herein and optionally provide authentication services to other service providers as well.

Whenever authentication system 102 is described as performing a task (such as receiving information from a user, authenticating the user, etc.), either a single component or a subset of components or all components of authentication system 102 may cooperate to perform the task, as applicable.

Initial Configuration of Cloud-Based Authentication Services

As explained above, Acme Bank has contracted with the owner of authentication system 102 to provide authentication services for Acme Bank's users. Also as explained above, such services can be used for primary authentication (e.g., authenticating a given user to website 112 each time the user visits), secondary authentication (e.g., authenticating the user as part of a password reset request), or when additional scrutiny is otherwise desired (e.g., in conjunction with a large financial transaction).

System 102 provides authentication services via an application programming interface (API), through an iframe element that can be included in the service provider's website (e.g., iframe 120), or through other mechanisms as applicable. A user of the service provider need not know where the stimuli are stored, nor where the authentication decisions are made (e.g., made by the service provider or made by system 102). Thus, when providing authentication services for a given service provider, system 102 may communicate directly with a client (e.g., through an iframe included on the service provider's website or a portion of the display in a mobile/tablet application) and may also communicate via an intermediary (e.g., by providing the service provider with the stimuli to be provided to the client and receiving responses from the client back via the service provider).

In various embodiments, when a service provider initially contracts to use authentication system 102, the service provider completes a configuration process. Specifically, a representative of the service provider creates an account with system 102 and defines various policies 110 that should be applied to the authentication of the service provider's users. For example, the service provider can specify the number and type of stimuli that should be presented by system 102 to a new user of website 112 during the learning phase and the number of such stimuli that the user must classify during that learning phase (e.g., that a user should select three likes and three dislikes or that a user should select five likes (with dislikes being ignored or not presented as a selectable option). The service provider can also specify how many stimuli should be shown to users during proof phases, and/or what error rates are acceptable (e.g., in terms of false positives, false negatives, and/or how many consecutive authentication attempts are allowed) during the proof phases. For example, the service provider can specify that a user must correctly identify three likes and one dislike in order for an authentication attempt to be deemed legitimate. System 102 can also be configured to automatically determine the number of stimuli that should be shown to users for classification during a proof phase to achieve a desired level of certainty of the user's legitimacy, rather than requiring the service provider to supply a set number of stimuli.

In some embodiments, the service provider's rules 110 (also referred to herein as policies 110) are stored in database 106. Rules can also be maintained by the service provider and passed to system 102 as parameters during an authentication request from the service provider to system 102. Further, the service provider can specify in what form a result of an authentication attempt should be provided by system 102 to the service provider. For example, system 102 can be configured to return to website 112 a "pass" or "fail" response, a score (e.g., "user got 4/5 answers correct"), or a certainty level (e.g., "user is legitimate, with 80% confidence").

Service providers can also specify different rules for different types of users, and/or different rules for authenticating users attempting varying levels of service. As one example, "premium" users can be required to achieve a higher authentication score (described in more detail below) or classify more stimuli than "basic" users. In some embodiments, when a service provider requests authentication services (whether during enrollment/learning or during a proof), the service provider provides system 102 with the pseudonym of the user and also an indicator of the type of user, so that the appropriate policies can be applied. As another example, a user attempting to transfer money can be required to achieve a higher authentication score than when that same user attempts to check a balance. As yet another example, a higher threshold can be used when a user request appears suspicious for other reasons (e.g., connecting from a new IP address or a new device).

In various embodiments, service providers are provided access to an administrative console to system 102 through which they can configure visual aspects of the interface that will be provided by authentication system 102. As one example, a color theme or height/width specifications can be provided by the service provider so that the information presented in iframe 120 can be seamlessly integrated with content natively appearing on site 112. Service providers are also able to specify which types of stimuli are appropriate for classification by their users and/or which types of stimuli should not be used. As one example, a website intended for use by children could specify that cartoon images be used instead of words or photographs and that age-inappropriate concepts be avoided (e.g., those depicting beer or bikinis). As another example, a service provider can specify that different types of stimuli be used for different types of users (e.g., with picture-based stimuli used for one type of user and sound-based stimuli used for another type of user). As yet another example, a service provider can upload custom stimuli to system 102 for use with its users and/or can permit its users to upload stimuli, such as photographs or sounds, or prevent them from doing so, as applicable. In addition to providing site-wide rules, the service provider can also specify finer grained rules for individual users or groups of users.

In some embodiments, a first set of stimuli is used during a first time period to represent a user's preferences, while a second and different set of stimuli is used during a second time period. The two sets correspond to each other in the sense that for each stimulus in the first set there is a stimulus in the second set that corresponds to it, and vice versa. Two stimuli are said to correspond to each other if the user's classification of the two is/would be essentially the same with a very high likelihood. As one example, the first set of stimuli are images and the second set of stimuli are sounds that correspond with the images (such as a photograph of a dog, and then a sound of a dog barking); in another embodiment, the two sets are represented by the same media format, i.e., may all be images. In this scenario, two different dogs may be pictured in the two different sets (both representing dogs). As another example, a picture of a dog in the first set could correspond to an image of the word "dog" or a cartoon of a dog, etc., in the second set.

Initial User Enrollment in Authentication System

The first time Alice decides to avail herself of Acme Bank's online banking features, she visits website 112 and commences a registration process with Acme Bank. She is asked to choose a username and supply information such as her full name, phone number, and bank account numbers. She is also asked to select a password. In some embodiments, such as where the services of system 102 are used for primary authentication, a minimal amount of information is collected by the service provider.

Figure 2:
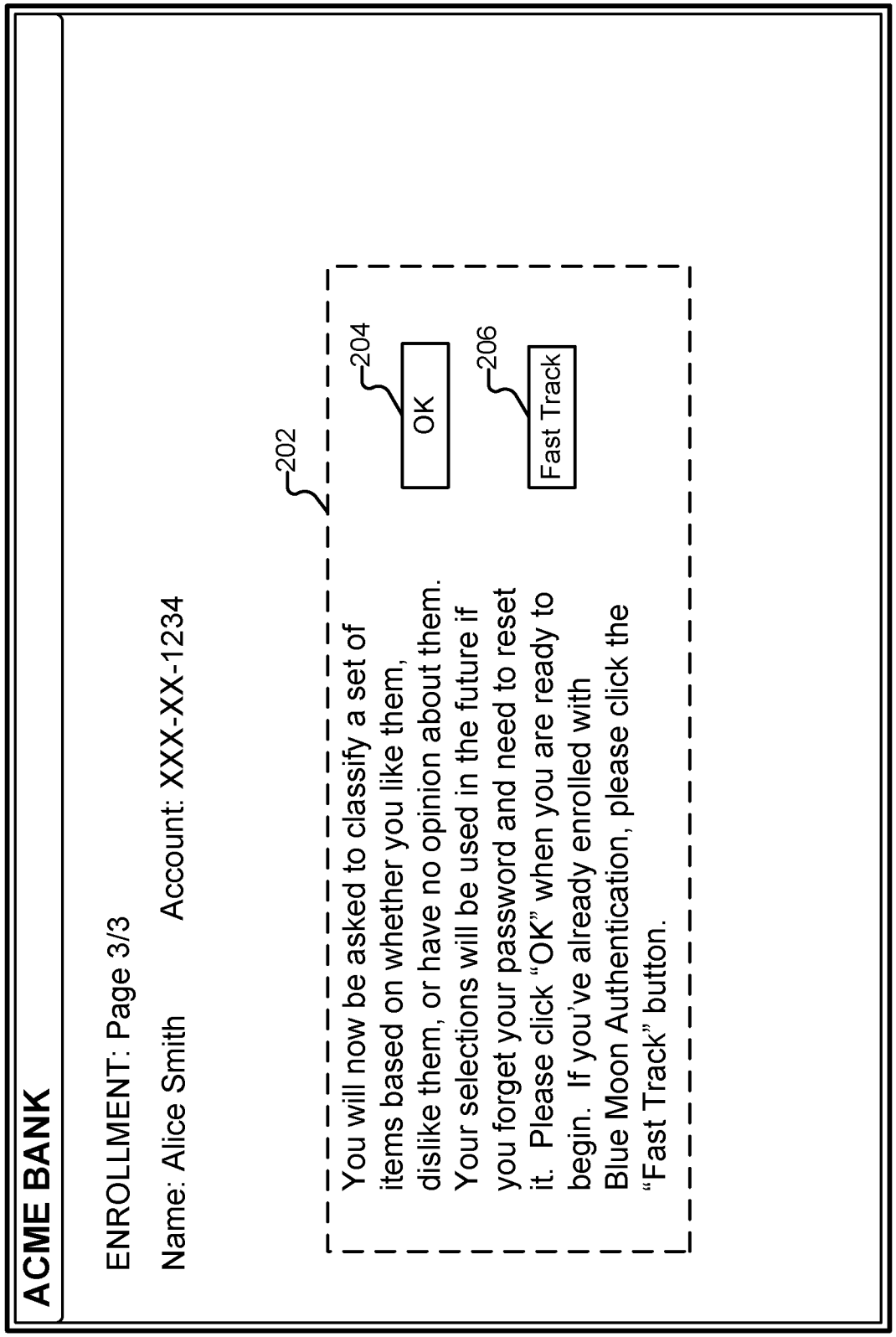
FIG. 2 illustrates a portion of a registration interface as rendered in a browser.

As part of the registration process for website 112 (or, at any other appropriate time, such as can be specified by the service provider), Alice is registered with system 102. As one example, depicted in FIG. 2 is a portion of Acme Bank's online registration form. On previous pages of the form (not shown), Alice provided information to Acme Bank such as her name and account number. Included in the page depicted in FIG. 2 is an iframe element 202. Through iframe element 202, content is served by system 102 to Alice. In particular, Alice is provided with an interface through which she will be transparently enrolled with system 102. Specifically, a profile for Alice will be created in system 102 and stored in database 106.

As will be described in more detail below, in some embodiments, a pseudonym is used to identify Alice in system 102 and Alice's actual identity is kept confidential by the service provider. Techniques such as encrypting Alice's profile or portions of her profile can be used to minimize or eliminate the vulnerability of Alice's data to compromise. Also as will be described in more detail below, if Alice already has a profile with system 102 (e.g., because a profile in system 102 was created for her when she registered with online retailer 122, or because she registered directly with system 102 at one point), in some embodiments Alice is given the option of linking her existing profile with website 112, making a duplicate of her profile for use with website 112, or otherwise shortening the process of creating a profile in system 102 with respect to web site 112.

Figure 3:
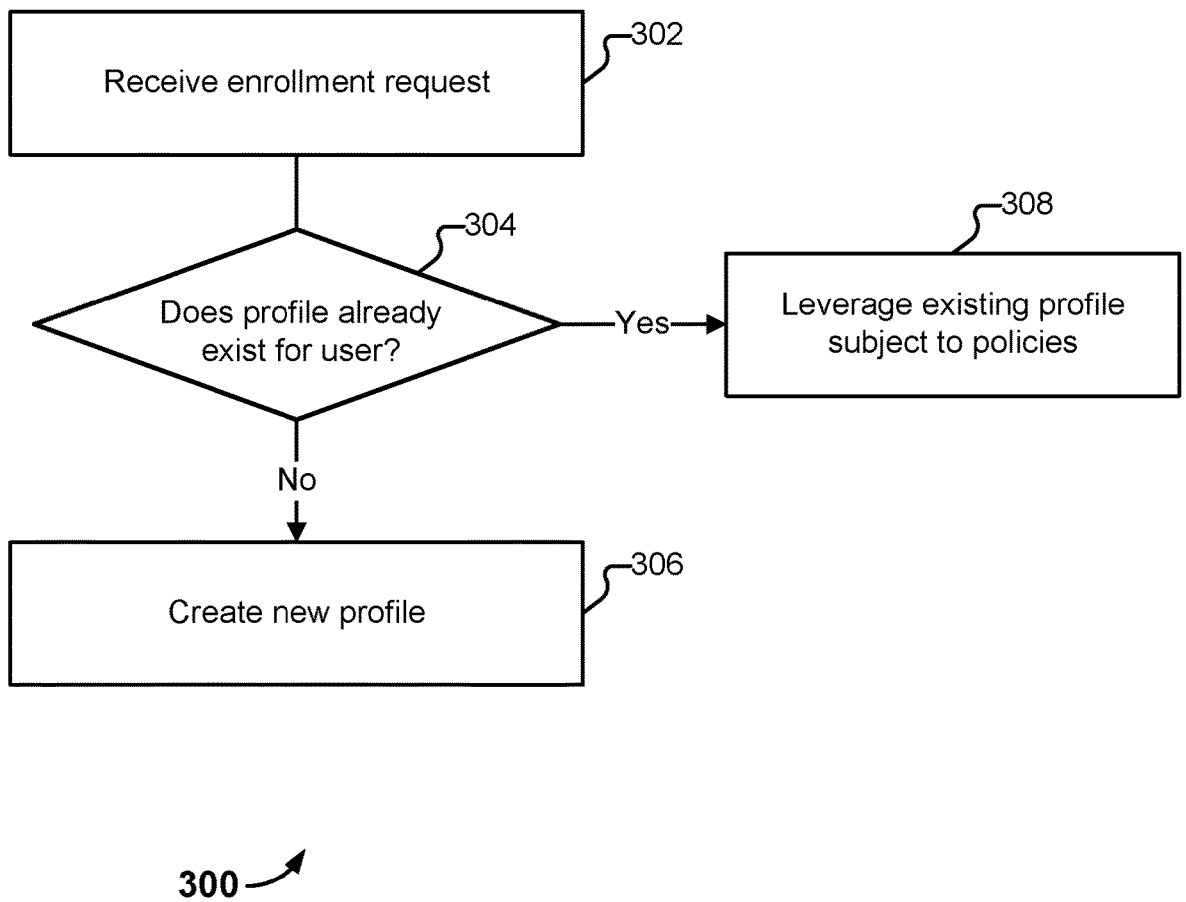
FIG. 3 is a flow chart illustrating an embodiment of an enrollment process.

FIG. 3 is a flow chart illustrating an embodiment of an enrollment process. In various embodiments, the process shown in FIG. 3 is performed by system 102. The process begins at 302 when an enrollment request is received. As one example, an enrollment request is received by system 102 when Alice reaches the interface shown in FIG. 2 and selects "OK" button 204 or "Fast Track" button 206.

In some embodiments, the service provider (e.g., Acme Bank) stores a mapping between the username it uses to refer to its user (e.g., "AliceSmith" or "Alice22") and a pseudonym known to system 102. The service provider can create the pseudonym (e.g., "acmebankuser123456") for its user and pass the pseudonym on to system 102; the service provider can request that system 102 generate a pseudonym and provide the generated pseudonym to the service provider (which is then stored by the service provider); or the use of pseudonyms can be omitted, as applicable (e.g., with system 102 using the same username for Alice as is used by Acme Bank).

Optionally, at 304 a determination is made as to whether or not the user already has a profile on system 102. A variety of techniques can be used to determine whether a given individual has an existing profile on system 102, including by asking the user whether or not the user has already established a profile on system 102. As one example, if Alice clicks on "Fast Track" button 206, system 102 can ask Alice to provide identifying information (e.g., soliciting her email address and service provider 122's name), use the provided information to locate a profile in database 106, and verify Alice's identity through the stored classification information. System 102 can also use the information provided by Alice to request a pseudonym for Alice from site 122 and use that information to access Alice's profile, e.g., if the profile or parts thereof are encrypted, or if the index to user profiles is based on pseudonyms rather than, e.g., email addresses. As another example, cookies stored on laptop 114 may be usable to locate a profile for Alice in database 106. As yet another example, other information about Alice (such as her phone number or a credit card number) may be used to search database 106 and determine that Alice has an existing profile with system 102.

If a user has an existing profile, the profile can be leveraged (308), subject to any applicable policies. As one example, suppose a profile for Alice was previously created in system 102 on behalf of online retailer 122. Retailer 122 (and/or Alice) may consent to the re-use of that profile by other service providers such as Acme Bank, either by allowing additional access to the existing profile or by allowing the duplication of the profile or portions thereof. In such a scenario, any additional information observed by Acme Bank (e.g., IP addresses of Alice, successful authentication attempts, cookies, device IDs, etc.) or by system 102 while providing services to Acme Bank can also be considered when authenticating Alice to retailer 122, and vice versa.

Acme Bank (or retailer 122 or Alice) may also forbid the re-use of any existing profiles for a user and require that a completely new profile be created for the user. When a user adds new classifications to an existing profile, the classifications may be specific to some service providers (e.g., retailer 122) or may be shared between multiple service providers (e.g., both retailer 122 and website 112). In some embodiments, two or more service providers may become aware of an overlap between their users, and merge profiles of users that use both their services. One way this can be done is by identifying users (e.g., by name, address, credit card, email address); comparing lists of users to determine overlap; determining the associated pseudonyms for the different service providers and for the overlapping users; and sending a request to system 102 to merge these profiles. This process can also be performed in a way that does not expose customer data, as described in more detail below.

If the user does not already have a profile on system 102, if portion 304 of process 300 is omitted, or if policies do not allow for the re-use of an existing profile, a profile is created for Alice at 306.

Stimulus Classification

In conjunction with the creation of a profile on system 102, a user is presented with a set of stimuli to classify. For example, Alice may be shown a picture of a particular comedic actor and asked to indicate whether she finds that actor "funny" or "not funny." Her response is stored by system 102 and can be used at a later point to assist in authentication.

Collection of Additional Information

The stimuli shown to Alice during enrollment can be selected entirely at random (and/or the exact same set of stimuli can be presented to all enrollees). In some embodiments, additional information is collected (either by Acme Bank, or by system 102, or both) and used to determine stimuli (and/or categories of stimuli) that are likely to be relevant to Alice. The additional information can also be cross matched against publicly available knowledge about Alice to remove stimuli for which Alice's classifications would be guessable. As one example, if Alice has a penchant for knitting (e.g., as determined from shopping history obtained from online retailer 122), other types of crafting will likely be relevant to Alice as well. If Alice has posted public reviews of candle making equipment, however, stimuli pertaining to candle making may be omitted. As another example, if Alice lives on the West Coast, she is more likely to have eaten sushi (and formed an opinion about particular pieces of sushi) than if she lives in the middle of the United States (or in a country where sushi is not typically eaten). If Alice has posted public reviews of sushi restaurants (e.g., on a restaurant review site), stimuli pertaining to sushi may be omitted. As yet another example, if Alice's profile with social networking site 126 indicates that she likes romantic comedy movies, Alice is unlikely to have seen very many horror movies. Accordingly, questions such as "have you seen Horror Movie X" are likely to all be answered as "no" by Alice and will not be presented as stimuli during the enrollment process. As yet another example, if Alice's IP address indicates that she is at a university, questions about classic literature and preferences for or against subjects such as chemistry and foreign languages are more likely to be of interest to Alice. As another example, since Alice does not live in Asia, system 102 will not probe her for her opinion of jackfruit, because she is unlikely to have an opinion on it. Conversely, if Alice did live in Asia, the question would likely be a good one, as the bulk of individuals there would have an opinion and whether or not they like jackfruit would be an approximately 50/50 split.

In some embodiments additional information is collected about Alice in a manner that is transparent to Alice. For example, when Alice's browser renders iframe element 202, system 102 (and/or Acme Bank, as applicable) may capture the identity and version number of the browser with which she accesses site 112, the operating system and version number of client 114, and other information associated with client 114, such as its IP address, cookie information, browser history information (usable to determine topics of interest to Alice), and identities/versions of applications installed on client 114, if available. Other examples of information that can be obtained from client 114 about Alice include a list of songs which she has recently listened to on client 114, a list of videos she has recently watched, and files she has recently downloaded. The captured information can be used to glean both positive (things that the user likes) and negative (things that the user does not like) classification information. Positive preferences can be expressed by acts, whereas negative preferences are expressed by acts of avoidance (skipping to the next song, not clicking a given advertisement or search result, or interrupting a movie early).

System 102 can also obtain information about Alice from third party sources in a variety of ways. As one example, system 102 may periodically scrape publicly accessible information about Alice from site 126 (such as posts that she makes) and site 122 (such as reviews that she writes). The operator of system 102 may also purchase information about Alice from an aggregator of personal information, or may employ its own such aggregator 124. As yet another example, system 102 may contract with site 122 (or other applicable partner) to obtain non-public information pertaining to Alice, such as her purchase history. In such a scenario, system 102 may share back other information it has learned about Alice (e.g., by enlarging her profile to include the additional information), as applicable. Other example types of information that can be obtained from third parties include movies currently in Alice's queue with an online movie service (and/or movies she has previously watched), songs Alice has recently listened to (e.g., via a cloud-based music service), and the length of time spent at various websites (e.g., indicating that Alice spends a great deal of time on news-oriented sites and very little time on sports-oriented sites). In some embodiments at least some of the information is collected via an agent installed on client 114 or integrated into a browser plugin. In some embodiments, system 102 may not want to know the exact songs Alice has listened to, etc., as this might be construed as a privacy invasion, but may still be interested in acquiring information about genres of music Alice is interested in—or expresses dislike for—but without knowing which one necessarily, and without knowing more detailed information.

In some embodiments Alice is asked to supply various "seed" demographic/psychographic information at enrollment time, discussed in more detail below.

Phase 1: Enrollment/Learning

Figure 4:
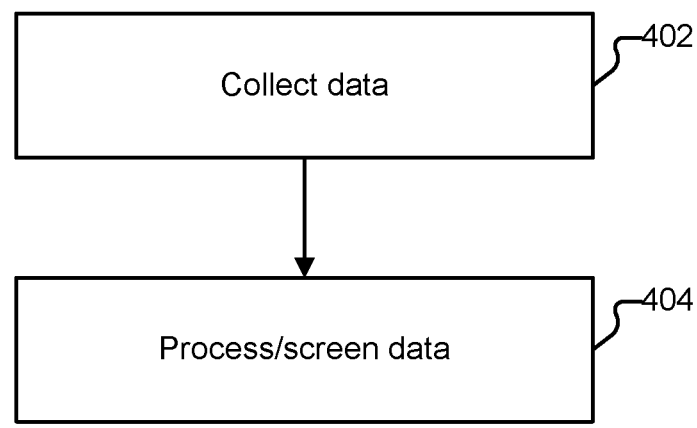
FIG. 4 is a flow chart illustrating an embodiment of a portion of an enrollment process.

FIG. 4 is a flow chart illustrating an embodiment of a portion of an enrollment process. In various embodiments, the process shown in FIG. 4 is performed by system 102 in conjunction with the processing performed at 306, 308, or after the processing performed at 306 or 308. The process begins at 402 when data associated with a user is collected. As previously explained, a variety of information can be collected with respect to a given user, and the information can be collected from a variety of sources. As one example, if the operator of system 102 has an agreement with online retailer 122, Alice's shopping history with respect to online retailer 122 may be collected at 402. As another example, suppose Alice has an existing account with online retailer 122 and has an existing purchase history with the retailer. Also suppose online retailer 122 subsequently chooses to implement the techniques described herein to offer additional security to its users when they engage in large or otherwise suspicious purchases. At 402, online retailer 122 would evaluate Alice's stored shopping history. As yet another example, at 402, system 102 can receive information from aggregator 124, can scrape social networking site 126 for publicly available information (and/or obtain private information via an API), and can also pose questions to Alice, examples of which are provided below.

At 404, the data received at 402 is processed to determine a set of stimuli that are likely to be relevant to a given individual. Suppose that the process shown in FIG. 4 is being used in conjunction with a user of online retailer 122, Bob. Bob has purchased several books on barbequing, has reviewed a motorcycle helmet, and has watched several action movies through retailer 122's online video streaming service. This information about Bob is received at 402. At 404, the received information is processed to determine a set of stimuli that are likely to be of interest to Bob.

Illustrated in FIG. 5 is a chart depicting on one axis various categories of stimuli 502, and on the other axis, a set of classifications for those stimuli 504 (in this case, "like" vs. "dislike"). Based on the information received at 402, a determination is made that Bob fits a profile of a "macho" man between the ages of 20 and 50. Statistically, such people are likely to have no opinion about horses (70%), are extremely likely to dislike bingo (90%), and have a roughly even chance (50/50 and 40/50) of liking skydiving and bookstores, respectively. Since system 102 has access to the profiles of many different people (including both their demographic/other information as well as their classifications of stimuli) it can compile extensive cross-market statistics of usage, such as the relative preferences for different stimuli.

Based on the information shown in FIG. 5, a determination is made that Bob should be asked to classify stimuli pertaining to skydiving and bookstores, because he is likely to have an opinion about those topics, and what his opinions are is unlikely to be guessable by others. Bob can also be asked to classify stimuli pertaining to bingo; however, an adversary may have an easy time guessing Bob's reaction based on rudimentary knowledge about Bob. Since 70% of people demographically similar to Bob have no opinion on horses, a decision is made not to include horse-related stimuli in the set presented to Bob.

Classification by the User

FIGS. 6A and 6B illustrate a set of questions and answers usable to select a set of stimuli. In some embodiments the questions and answers illustrated in FIGS. 6A and 6B are used at 402 and 404 in the process shown in FIG. 4. Suppose Bob has decided to register for an account with social networking site 126. As part of the enrollment he is asked to choose a username, a password, and to specify his age through the use of a range of ages (e.g., under 13, 14-19, 20-25, etc.). Site 126 has an agreement with system 102 to provide enhanced authentication services on behalf of site 126. In some embodiments site 126 provides to system 102 Bob's age range which is used as the sole criteria for selecting a set of stimuli that are likely to be of interest to him. Bob may also be asked as part of enrollment to specify his gender, and/or his gender may be implied based on a comparison of his first name to a dictionary of names, either by site 126 or by system 102. Suppose a combination of both Bob's specified age, and an assumption made based on his specified first name, are used to determine which stimuli are likely to be of interest to Bob. As one example, stimuli pertaining to bingo, shoes, fashion, and soap opera television shows will be excluded. Stimuli pertaining to sports teams, automobiles, beer, and computer games will be included. If Bob was under the age of 13, stimuli pertaining to certain foods that children traditionally dislike such as grapefruit, or items about which they are very unlikely to have a preference (such as brands of cigar) would be omitted. Similarly, if Bob indicated he was in the over 50 age group, questions about favorite vacation spots, cruise lines, and scotch preferences would be included. As an alternate example, information about Bob's client can also be considered when determining which stimuli to present. As one example, if Bob connects to site 126 using a computer running a Linux-based operating system and using a text-based web browser, an assumption can be made that Bob is a sophisticated computer user. If Bob connects to site 126 using a dialup-based Internet Server Provider and uses a very old version of the Internet Explorer browser application, an assumption can be made that Bob is a naïve computer user. In addition to determining which stimuli to present to Bob at enrollment, such information about his client can also be used when determining what scoring rules should be applied to authentication of Bob (e.g., because the client he uses indicates that his account is more or less likely to be compromised than a typical user of site 126).

As part of the enrollment process, Bob can also be presented with additional questions for the purpose of determining which set of stimuli are likely to be of interest to him. Portions 602 and 604 of FIGS. 6A and 6B respectively illustrate initial knowledge about Bob. Site 126 knows that Bob is between the ages of 20 and 25 because he specified that information as part of his registration. Site 126 (and/or system 102, as applicable) also made an assumption that Bob is likely a male. To confirm whether or not Bob is a male, he is asked that question at 606 (and 608). His answer can be stored as additional profile information in database 106. Based on his response ("male"), Bob is asked whether or not he played football in high school (610, 612). Suppose Bob answers that he did play football in high school (614). An assumption can be made that Bob is an active individual and may be interested in thrilling activities such as skydiving, mountain biking, motorcycle riding, etc. (616). Suppose Bob answers that he did not play football in high school (618). An assumption can be made that Bob is likely not an active individual, and also likely not interested in thrilling activities. (620). Additional questions are asked based on the responses provided to the football question. To confirm whether or not Bob might be interested in thrilling sports, at 622 Bob is asked if he would ever skydive. Bob answers "no" (624) and the set of knowledge about Bob is updated (626). As a result of the questions and answers shown in FIG. 6A, a set of stimuli that includes active sports and travel, but that excludes extreme sports, cooking, and bingo, will be selected. As a result of the questions and answers shown in FIG. 6B, a set of stimuli that includes active sports, travel, and college, but that excludes extreme sports, will be selected (628).

Figure 7:
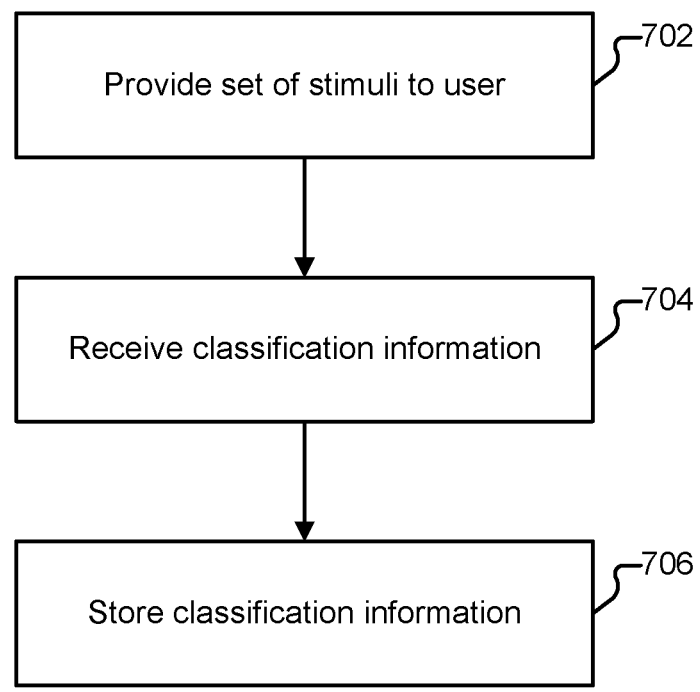
FIG. 7 is a flow chart illustrating an embodiment of a portion of an enrollment process.

FIG. 7 is a flow chart illustrating a portion of an embodiment of an enrollment process. In various embodiments, the process shown in FIG. 7 is performed by system 102 in conjunction with or after the processing performed at 306, 308, or 404. The process begins at 702 when a set of stimuli (e.g., such as food items and styles of music) is provided to a user. In some embodiments the user is first asked to choose which type of classification rules the user would like to apply. For example, the user can be asked to select up to four types of rules from the list provided above (e.g., "funny vs. not," "scary vs. not," "I do this often vs. not," and "I own this vs. not"). If the user selects only one type of rule, then he or she has to classify topics according to this rule during the setup. In some system configurations, the user is not asked what classification rules to use, but these are selected for the user by system 102 or an administrator of the applicable service provider.

At 704, classification information associated with at least some of the stimuli is received from the user. At 706, classification information associated with the user is stored. In some embodiments portions of the process shown in FIG. 7 are repeated. For example, sets of stimuli may be provided to a user in batches, and corresponding batches of classification information are received and stored as appropriate. In some embodiments, batches of classification information are received/stored in conjunction with a later authentication attempt, when the user has gained access to his or her account, and/or when the user otherwise chooses to update the stored classification information.

FIG. 8A illustrates an embodiment of an interface for capturing classification information. In some embodiments the interface shown in FIG. 8A is used in conjunction with the process shown in FIG. 7. Items 802 are presented to a user (e.g., at 402), such as Alice, at enrollment time, such as via iframe element 120. Alice classifies the items by selecting the checkbox that corresponds to the applicable answer. In some embodiments a default preference of "not sure" or "no opinion" is pre-checked. While in the example shown in FIG. 8A a total of 20 questions are shown as being presented, in various embodiments more, fewer, and/or a variable and/or dynamically and/or randomly determined number of questions are presented at enrollment, depending on such factors as the requirements specified by the service provider, degree of certainty and/or security required by the service provider, the nature and/or value of the resource(s) being protected, the quality, reliability, etc. of the particular questions presented, etc.

In the example shown in FIG. 8A, Alice has indicated that she thinks that comedian Joe Smith is funny (802), that she does not like anchovies (804), that she is unsure of whether she has ever played golf (806), and that she has never been to Chicago (808). After making all of her selections, Alice submits her classifications to system 102 (e.g., at 704). System 102 stores Alice's classifications, e.g., in database 106 for later use. Other kinds of information about the user's life that are neither readily available through data-mining, nor easily guessable include "do you sleep on the left side of the bed," "do you snore," "do you read in bed," etc. Different forms of questions can also be mixed within an interface. For example, Alice may be asked to rate some items on a scale of 1-5, to select 4 items that are cute from a list, and answer various questions using a set of radio buttons.

FIG. 8B illustrates an embodiment of an interface for capturing classification information. In some embodiments the interface shown in FIG. 8B is used in conjunction with the process shown in FIG. 7. As previously explained, classifications can be binary (e.g., I have done this/I have not done this). Classification information can also be collected using Likert items. For example, in the interface shown in FIG. 8B, instead of answering yes or no questions, users are requested to indicate whether or not they agree with statements on a five point scale, with 1 indicating a strong disagreement with the statement, 3 indicating a neutral opinion, and 5 indicating a strong agreement with the statement. Other expressions of preferences, such as expressions of habit, can also be input in a similar manner.

FIG. 8C illustrates an embodiment of an interface for capturing classification information. In some embodiments the interface shown in FIG. 8C is used in conjunction with a portion of the process shown in FIG. 7. In the example shown, users are asked to manually enter (e.g., into a form) their own list of items and corresponding classifications. Portion 702 of the process shown in FIG. 7 is omitted accordingly. In the example shown, a user has been asked to provide a list of at least 10 items that the user routinely purchases and a list of 10 items that the user does not purchase.

FIG. 9A illustrates an embodiment of an interface for capturing classification information. As one example, the interface shown in FIG. 9A may be shown to Alice after she selects "OK" button 204. In some embodiments the interface shown in FIG. 9A is used in conjunction with a portion of the process shown in FIG. 7. In the example shown, the user has been asked to select at least five words or phrases that describe the user's childhood. The user has selected "active" and "dogs" so far. If the user determines that no additional words are applicable, the user can click on link 902 to be presented with additional words/phrases. In various embodiments, different types of input devices can be used to indicate applicable words such as word 904. For example, the user can be asked to type in the words or phrases that he considers to be most appropriate, rather than selecting ones presented to him. As another example, a webcam or other eye tracking technology can be used to detect at which regions of the screen the user focuses on (and/or deliberately blinks twice after viewing). As another example, a gaming console can include a motion capture device through which the user can make selections. Other techniques for capturing (and later testing) classification can also be used. For example, in addition to answering written questions via website 112, classification information can also be captured acoustically (e.g., over the phone, via a series of voice prompts to which the user responds with a spoken "yes" or "no"). Similarly, the user could be played a set of audio clips and asked whether they like or dislike the sample. Other non-text entry methods can also be used, as applicable, such as sliders, rotating wheels, and devices used by the physically disabled.

Phase 2: Authentication

FIG. 9B illustrates an embodiment of an interface for capturing classification information to authenticate a user. In some embodiments, the interface shown in FIG. 9B is used in conjunction with the process shown in FIG. 10. Suppose Alice, after registering with website 112 (and providing classification information via the interface shown in FIG. 9A) stops using online banking for a period of time. She eventually forgets her password. To resume using the features of website 112, Alice must reset her password. Alice visits website 112 and selects an "I forgot my password" option from the appropriate location on the site. Alice is then presented with interface 950, which is served by system 102 by an iframe element. In the example shown, Alice is requested to select the items that best describe her childhood. After selecting the appropriate items, she clicks "done" and the information is submitted to system 102 (1002 of FIG. 10). The items shown in interface 950 need not exactly correspond to the items Alice previously selected. For example, if Alice used interface 900 to enroll her preferences, only a subset of the items might be shown in interface 950. What percentage of items to show in interface 950 is customizable, e.g., based on policies specified to system 102 by an administrator of the Acme Bank website 112. As another example, in some embodiments synonyms of the previously selected words may be shown, such as by showing "doggie" instead of "dog" or "fishing pole" instead of "fishing."

Figure 10:
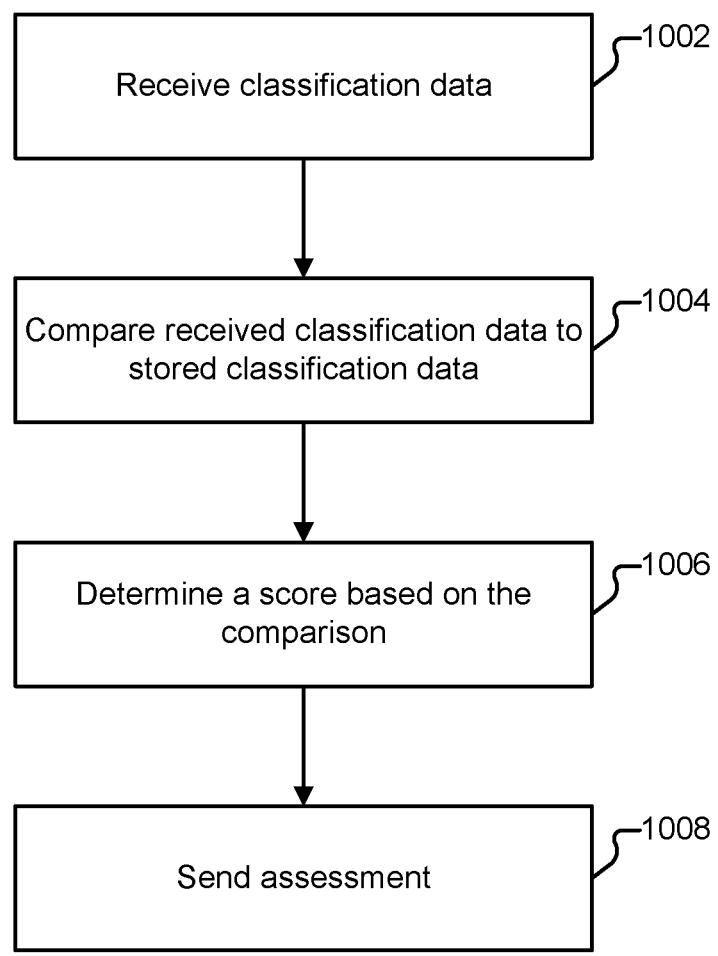
FIG. 10 is a flow chart illustrating an embodiment of an authentication process.

FIG. 10 is a flow chart illustrating an embodiment of an authentication process. In various embodiments, the process shown in FIG. 10 is performed by system 102. The process begins at 1002 when classification data is received, such as from a user. As one example, suppose Alice wishes to reset her password at site 112. When she selects a "reset my password" link at site 112, she is presented with (e.g., via an iframe element or via site 112 rendering information received from system 102, as applicable) interface 950, which challenges her to provide a set of responses. The items shown are selected by system 102 in accordance with the policies specified by an administrator of site 112 and stored in database 106. The classification data received at 1002 is provided by the user having selected radio buttons, checkboxes, etc.; through use of a sliding scale, a ranking of presented items, etc.; or a combination thereof (collectively referred to herein as a "selection" of classification data). At 1004, the received classification data is compared to stored classification data. At 1006 a score is determined based on the comparison performed at 1004. In various embodiments, the score is sent by system 102 to the service provider and the service provider determines whether an action should be authorized based on the score. As explained above, in other embodiments, other information can be sent to the service provider as a result of the score determination, such as an "allow access" or "deny access" message. Both the sending of the score and the sending of other determinations based on the score, such as "allow access," are examples of "assessments" sent to the service provider at 1008. In various embodiments, the user's answers during a given proof attempt and/or resulting score(s) are stored in database 106. Other information can also be included in the profile, such as audit information for billing, information regarding device identifiers, IP addresses, device types, and I/O behavioral data of the user (such as typing speed and mouse-over behavior). The collected statistical/other information can be used to form a historical profile of the user, and can be part of the decision whether to pass or fail a user in situations when the user score is close to a threshold.

Comparing Received Preferences to Stored Preferences

A variety of techniques can be used to store and subsequently compare stored classification information (e.g., received from Alice at enrollment) to subsequently received information (e.g., received through interface 950). For example, suppose system 102 makes use of the interface shown in FIG. 8A. In that scenario, system 102 makes use of a total of 20 different things (also referred to herein as "stimuli"), notated individually as $q_i$, where i is a value from 1 to 20. Each question $q_i$ can be associated with a directed graph $g_i$ with $d_i$ vertices. If there is a directed edge from vertex $v_{ij}$ to vertex $v_{ik}$, then an entry $w_{ijk}$ in an adjacency matrix A associated with the graph is set to a pre-set value $y_{ijk}$; if there is no such edge then the associated entry is set at a value T (e.g., negative infinity).

During the process shown in FIG. 7, the user is requested to answer some number of questions $q_i$, or as many as are applicable. These questions may be selected at random from a larger set of questions, which in turn may be selected from a yet larger set of questions based on known behavior or demographics of the user. An answer corresponds to selection of one or more of the vertices associated with this question. A selected vertex is associated with the value 1, while a vertex that is not selected is associated with the value 0. A variable $u_{ij}$ is used to record these values—$u_{ij}$ is set to 1 (resp. 0) if the vertex $v_{ij}$ is (resp. is not) selected in this process. The value U, which is specific to the given user, consists of the entire list of recorded values $u_{ij}$ for this user. The value U is stored by system 102. If the user doesn't answer certain questions (and/or has "no opinion"), such questions can be thought of as questions for which none of the vertices are selected.

In some embodiments, the classifications supplied at 704 in the process shown in FIG. 7 are evaluated to determine whether the enrollment is successful. For example, if the user answers all questions "yes," all questions "no," or leaves all questions as "no opinion," a problem may be indicated. One way of determining whether an enrollment attempt should be deemed successful is as follows. The sum of all ($w_{ijj}*u_{ij}$) is computed, for 0<i,j<n+1, where n is the number of questions (e.g., 20). This sum is denoted S1. If S1 is greater than some pre-set threshold value t1, then enrollment is considered successful, otherwise not. If the enrollment is not considered successful, then the value U is erased, and the user has to start over.

When an authentication is attempted (e.g., when Alice wishes to reset her password), system 102 retrieves the associated value U. Then, the user is requested to answer questions $q_i$. An answer (1002) corresponds to selection of one or more of the vertices associated with this question. A selected vertex is associated with the value 1, while a vertex that is not selected is associated with the value 0. A variable $z_{ij}$ is used to record these values; thus, $z_{ij}$ is set to 1 (resp. 0) if the vertex $v_{ij}$ is (resp. is not) selected in this process.

To determine whether a given authentication attempt should be considered successful, the following is performed at 1004: The sum of all ($w_{ij}k*u_{ij}*z_{ik}$) is computed, for $0<i,j,k<n+1$. This sum is denoted S2. At 1006, it is determined whether S2 is greater than some pre-set threshold value t2. If so, authentication is considered successful, otherwise not.

The value $y_{ijk}$ is the "benefit" of selecting outcome j for question i during enrollment, and then subsequently selecting outcome k for question k during authentication. A low value, such as the value T, can be used as a "punishment" for answering a question incorrectly, whereas a higher value is to be interpreted as a reward for answering the question correctly.

Numerical Example

Suppose q1="Do you think Joe Smith is funny?" with three possible answers "yes," "neutral," and "no." These possible answers correspond to three nodes $v_{11}$, $v_{12}$, and $v_{13}$. All values $u_{11}$, $u_{12}$, and $u_{13}$ are set to 0. If the user selects that she thinks Joe is funny, then the value $u_{11}$ is set to 1; if she has no strong opinion, then $u_{12}$ is set to 1; and if she does not think he is funny, $u_{13}$ is set to 1.

Additional constraint values are $y_{111}=3$, $y_{112}=-5$, $y_{113}=T$, $y_{121}=0$, $y_{122}=0$, $y_{123}=0$, $y_{131}=T$, $y_{132}=-6$, and $y_{133}=4$.

When the user attempts to authenticate, the values $z_{11}$, $z_{12}$, and $z_{13}$ are set. The nine combinations of preferences during enrollment vs. authentication are as follows:

(YES, YES): $S2=y_{111}=3$
(YES, NO OPINION): $S2=y_{112}=-5$
(YES, NO): $S2=y_{113}=T$
(NO OPINION, YES): $S2=y_{121}=0$
(NO OPINION, NO OPINION): $S2=y_{122}=0$
(NO OPINION, NO): $S2=y_{123}=0$
(NO, YES): $S2=y_{131}=T$
(NO, NO OPINION): $S2=y_{132}=-6$
(NO, NO): $S2=y_{133}=4$

Thus, if the user first says she thinks Joe Smith is funny (during enrollment), and later says she does not during authentication, then the sum S2 becomes minus infinity. The same thing happens if she says that she does not think Joe is funny during enrollment, and later says she thinks he is. (In various embodiments, the punishment is set to a value of much smaller absolute value. For example, while a correct answer may give 5 points, an incorrect answer may cause the loss of 20 points.) However, if she has no opinion during enrollment, then her answer during authentication always results in the sum S2=0. If she has an opinion during enrollment, and no strong opinion during authentication, the sum is set to a small negative value. If the user retains her like or dislike from enrollment to authentication, S2 is a positive number.

The assignment of low absolute weights allows for the later cancellation of incorrect answers to questions that the user has no strong opinion of (e.g., the types of questions where temporal variance is going to be the greatest). The assignment of large negative weights introduce strong negative feedback for questions where users have a strong opinion, but where the answer during authentication is incorrect. The assignment of positive weights allow for the detection of correct answers given during authentication. The assignment of low absolute weights reduces the impact of a small number of incorrect answers during authentication, where the incorrect answers are not contradictory with the users previously stated opinion, but merely not in complete agreement with these.

As multiple questions are considered, the sum S2 corresponds to the cumulative value of all these contributions from the different questions. A sum that is greater than the set threshold t2 means that the user answered in a similar-enough manner during authentication as she did during enrollment. In some embodiments if the sum is not greater than this threshold, then the user either mistook a YES for a NO (which is unlikely) or vice versa; stated that she had no opinion in the authentication phase for a sufficient number of questions she stated an opinion for in the enrollment phase, or a combination. The threshold t2 of the authentication phase, and the values $y_{ijk}$ are set in a manner that balances the risk for false positives with the risk for false negatives, and reflects the degree to which the answers to these questions are estimated to be maintained over time in some embodiments. The threshold t1 of the enrollment phase is set to guarantee a sufficient number of answers that are not "no strong opinion," in turn making it impossible to authenticate by answering "no opinion" to all or too many questions. In some embodiments, several values t2 are used (e.g., one for each type of access right) out of some collection of possible values and types of account access and privileges. The value t2 can be a function of the value t1, and of some minimum value required for access, as well as of other parameters describing the user and his or her risk profile.

Questions with more than three possible answers, such as degrees of opinion, and questions that have only two possible answers, and any type of question with multiple answers can be scored by adapting the techniques described herein.

In some embodiments instead of assigning the variable $y_{ijk}$ an arbitrary value describing the associated reward or punishment, a set of values representing $y_{ijk}$ can be selected and saved. Each such value will be a point in a two-dimensional space, with an x-coordinate and a y-coordinate. For practical purposes, we will assume that all the x-coordinates are distinct, and that all coordinates are represented by integer values in a given range from 0 to p, where p is a system parameter. Associated with each user is a random polynomial f(x) described with random integer parameters in the same range, 0 to p, and where the polynomial is evaluated modulo p.

For an instance $y_{ijk}$ with a large positive value, a large number of points on the curve f(x) are selected and associated with the indices i and k; for a large negative value, a small number of such points are selected; and for a value $y_{ijk}$ inbetween, an intermediary number of such points are selected. The exact mapping between values of $y_{ijk}$ and the number of selected points on the curve f(x) is a system parameter that can be customized to minimize false positives and false negatives. The variable $R_{ik}$ is used to denote the collection of points associated with $y_{ijk}$, where a large number of points from f(x) is selected if $y_{ijk}$ is large, and a smaller number of points from f(x) are selected if $y_{ijk}$ is small. Once a number of points on f(x) has been selected, these are stored in the record $R_{ik}$, along with random points on a random polynomial f(x) to fill up those positions that do not contain f(x) values, up to a given maximum number of values that is a system parameter. Here, f(x) has the same or larger degree than f(x), or corresponds to a random selection of points from the appropriate space. If for each value $y_{ijk}$, ten points in $R_{ik}$ are stored, then a high $y_{ijk}$ value could be represented by ten points from f(x); a value $y_{ijk}$ close to zero could be represented by eight values from f(x) and two values from f(x); and the value T could be represented by ten values from f(x). The ordering of values from f(x) and f(x) as they are stored in $R_{ik}$ would be random or pseudo-random, and not disclosed.

Each value $y_{ijk}$ would be represented in this manner. The matrix of all values $R_{jk}$ would be saved. This takes the place of the previously defined value U.

In the above example, the degree of the polynomial f(x) may be chosen as n*10−1. This means that, for reconstruction of the polynomial f(x) from recorded points, it is necessary to know n*10 points on the curve. The degree of f(x) could, more generally, be chosen as n*L−1−d, where L is the number of points stored per record $R_{jk}$, and d is an integer value regulating the balance between false positives and false negatives, and corresponds to the total number of values from f'(x) that can be selected as all questions are answered, while still passing the authentication phase.

During the authentication phase, the user selects answers. For each such answer, she selects an associated collection of points, in turn associated with the values i (of the question) and k (of the response to the question). During authentication, the machine used by the user does not know what elements are from f(x) and what elements are from f'(x). However, if a selection is made for which $R_{jk}$ has a large portion of values from f'(x), then it is unlikely that only points from f(x) are going to be selected, and therefore, unlikely that the polynomial f(x) can be reconstructed. If there is a failure, the machine can try another set of points corresponding to the same user selection. A large number of these can be tried. If more than a certain number, say 1000, are tried, then the login script can generate an error to the user and request that the user attempts to authenticate again. An attacker would not have to limit himself to 1000 attempts, but if he has a large number of incorrect selections, he is unlikely to ever be able to reconstruct the polynomial. A machine can determine whether a polynomial is correctly interpolated by trying to compute f(x) on an input value x given by the server. If this is done correctly, then the server will allow the client access, and call the authentication attempt successful. The machines would not have to communicate the values in the clear, but could do this over an encrypted channel, or the client machine may send a one-way function of the result f(x) for the requested value x. Since the server knows the polynomial f(x) as well as x, it can verify whether this is a correct value. It is also possible to use an f-value for a known x-coordinate, such as x=0, as a cryptographic key, provided this point on the curve is never chosen to be part of an entry $R_{jk}$. Thus, a user that answers a sufficient number of questions correctly would enable his computer to compute f(0) using standard interpolation techniques (and as described above), thereby deriving the key f(0); a computer that fails to compute f(0) would not be able to perform the associated cryptographic actions. Thus, users who fail to authenticate sufficiently well would cause their computer to be unable to perform such actions.

In various embodiments other techniques are used to score stored (and subsequently received) preferences. For example, the entropy of a particular question can be used as a weight that is used when computing S2. Thus, a question such as "do you sleep on the left side of the bed" may be inherently worth more points (based on its entropy) than a question such as "do you like ice cream." Special rules can also take into account answers—particularly to life questions—that wrong answer to which may cause an authentication attempt to fail irrespective of the other questions being answered correctly. For example, if Alice indicates that she has been to Chicago at enrollment, and then subsequently denies being there, such an event might indicate that an attacker is trying to impersonate Alice. Conversely, mechanisms can also be used to make sure that for questions the answers to which might evolve over time (e.g., fondness for certain foods considered to appeal only to adults, such as mushrooms and sushi) don't result in false negatives.

Policies

A variety of policies can be put in place based on the security and other needs of website 112 (or other appropriate entity such as sites 122, 126, and 128). For example, different users may have different personal thresholds for what will constitute a valid authentication and what will not, but certain global minimums can be applied simultaneously. Additionally, different actions can be taken based on factors such as by how much a threshold was exceeded. For example, in a banking context, several thresholds could be used in which if the highest threshold is exceeded, the user is permitted full access to his or her account. If the second highest threshold is exceeded, the user is permitted full access to the account, but a flag is set alerting an administrator to review the user's account once the user logs off. Other lower thresholds can also be set with their own corresponding set of permitted actions, such as allowing the user read-only access to the account, informing the user that access will only be granted after any additional step is performed (e.g., requiring the user to make or receive a phone call, respond to a piece of email, send a text message, etc.).

Policies can also be used to specify, e.g., how many stimuli a user must classify, and from how many different categories (e.g., music vs. sports vs. food) the stimuli classifications must come. If a large pool of items are available for users to classify, in some embodiments the selection of which items a user is asked to classify is randomized and/or the interface used for authentication is randomized. Policies can also be used to specify whether—if only one or two questions are answered incorrectly during authentication—the stored classification information should be updated to reflect the discrepancy. For example, in some embodiments if a user indicates a liking for a single food that was not previously liked, and does so multiple times, the classification information for that item for that user will be updated automatically to reflect the user's new classification. As another example, if a given item was deemed as a "no opinion" item at enrollment by system 102 but is subsequently rated by the user as a "like" or "dislike" in conjunction with an otherwise successful authentication, the user's classification of that item can be updated to reflect the user's actual opinion.

In various embodiments users, upon successful authentication, can initiate an "update" process in which they are permitted to repeat the process shown in FIG. 7 to update classification information. The update process can be triggered by the user (e.g., after coming back from a vacation during which several new things were tried), and can also be triggered by external events, such as attacks on system 102 or any of the websites 122, 124, or 128, or environmental events, such as a general interest in a particular type of media or information. It is also possible to avoid testing a user (during the proof phase) on aspects that have a temporary bias, such as interest in soccer during the World Cup.

System 102 can also draw attention to changed answers (e.g., after the user is successfully authenticated), such as by asking, "Have you changed your mind about mushrooms?" or "Did you recently visit France?" In the case of whether or not the user has seen a particular movie, the system can be configured to be willing to permit or otherwise be more tolerant of "errors" in one particular direction. The tolerance of such errors may relate to the number of classifications of the type that does not correspond to previously recorded information. For example, if the user states that he has seen a large number of the movies for which the system has no information recorded for this user, then it may be that this user has suddenly started to watch a lot of movies, and therefore, the system may be more tolerant to accept recorded non-seen movies as correct selections even if the user says he has seen them during the proof phase. However, other classes are less likely to have this pattern—such as commercials, that have no intrinsic value to the user, and therefore are not sought out, and which are only aired during a limited period of time.

Additional information, such as the presence or absence of a cookie, can be used to adjust thresholds (and permitted actions/levels of access) accordingly. As another example, suppose Alice's phone 116 includes a GPS. In some embodiments a side channel may be used to capture Alice's location information and to present Alice (e.g., in interface 950) with a question that asks if she was in <location> last week. Alice's GPS coordinates can also be used to determine the selection of the threshold required to pass authentication: a person attempting to authenticate from a location close to Alice's believed location (e.g., her home address, places she frequents, etc.) may be offered a lower threshold than a person who is distant from all likely GPS positions of Alice. In some embodiments, multiple types of additional information are used/combined. For example, if Alice's GPS reports that she is currently in California, but her alleged IP address reflects that she is in Romania, the threshold score needed to gain access to her account may be increased, she may be required to supply a username and password, and also provide classification information whereas she might otherwise only be required to supply a correct username/password, etc.

In various embodiments, classification information collected by a user is grouped into sets such as "information a family member or close friend might know," "information potentially subject to shoulder surfing," "information potentially discoverable by reading third party sites," etc. Depending on context, during authentication, certain sets of classification information can be excluded from being queried or otherwise discounted. As one example, if Alice has never previously purchased video games on online retailer 122, but one day attempts to check out a cart with 12 video games, the transaction may be legitimate, but may also indicate that Alice's son is attempting to buy games without Alice's permission. In order to verify that Alice is the person attempting the transaction, online retailer 122 (e.g., via an iframe, API, or other interface to system 102) may exclude questions answerable by family members (e.g., which side of the bed she sleeps on) and instead ask questions such as the one posed in interface 950.

As another example, suppose gaming network 128 is subject to attacks by nefarious individuals who compromise the usernames and passwords of all users of network 128. In some embodiments, other sites, such as bank 112 will apply heightened scrutiny to its own users, and in particular, to those (such as Bob) who fit the same demographic of the primary users of site 128.

As yet another example, if an attack is being perpetrated against computers having a particular operating system and/or browser version, visitors to site 122 with client devices that have the properties of those being attacked may be challenged to provide classification information as part of the authentication process, while other visitors whose clients do not have those characteristics will not.

As yet another example, if a chance exists that a keystroke logger or screen scraper has been deployed against client 114, stimuli that has not previously been presented to client 114 (but instead only to client 116) may be presented.

Figure 11:
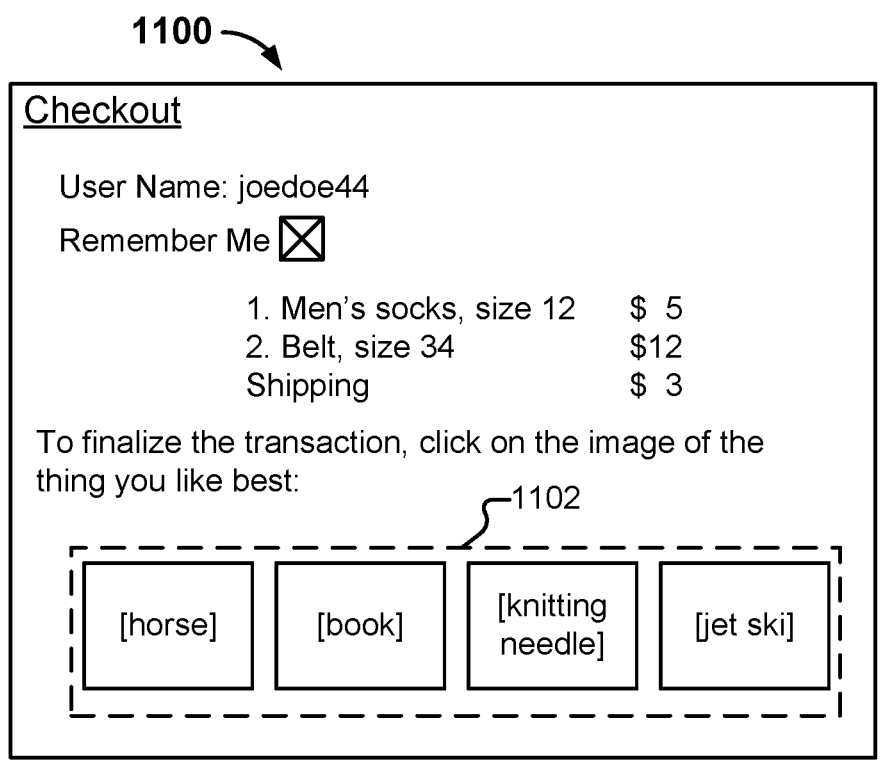
FIG. 11 illustrates an embodiment of a shopping cart interface.

FIG. 11 illustrates an embodiment of a shopping cart interface. In the example shown, as part of every transaction, or whenever a transaction appears to be suspicious, or whenever otherwise appropriate, instead of selecting a "submit" button to finalize payment, the user is asked to select an image corresponding to something the user likes best. In the example shown in FIG. 11, an image of a horse, an image of a book, an image of a knitting needle, and an image of a jet ski are presented in an iframe 1102 that serves content from system 102. The user may have previously selected one of the stimuli as being preferred (e.g., the user may have indicated a love of horses). Each of the items shown may also be entirely new. For example, if the transaction is not a suspicious one, interface 1100 can be used to augment the information stored in database 106 about the user, may be used to test the entropy of questions for future use, and/or may be used for other purposes. By adding new stimuli and by providing only a portion of all known stimuli, an attacker may have a more difficult time guessing which stimuli are associated with Alice, and have a harder time attempting to obtain the correct answers to the questions to be asked in a future authentication session.

If the incorrect image is selected, a variety of actions can be taken, including presenting a new set of images (and allowing the transaction to complete if at least ⅔ of questions are answered correctly), an alert can be emailed to the user or sent via SMS, the transaction can be blocked until the user contacts customer service, etc.

One use of the interface shown in FIG. 11 is to reduce "friendly fraud"—that is fraud perpetrated by someone who knows the user. A family member, coworker, or similar individual may have access to the user's computer but may not know which picture to select, thus offering at least a minimal amount of protection against friendly fraud than an interface which does not include the images.

Another use of the interface shown in FIG. 11 is to probabilistically detect malicious software outbreaks, such as in a geographical region, among members of a demographic or other group, or members of a social network. If detection engine 130 of system 102 notices that, statistically, more failures to pick the correct image are occurring at checkout, a security problem is indicated.

Additional Detail

Encryption

In various embodiments, profile information stored in database 106 or portions of the profile information is encrypted. A variety of techniques can be used to encrypt (and decrypt) the profile as needed. As one example, an arbitrary decryption key can be stored by the service provider and provided to system 102 along with the pseudonym of the user when authentication services are needed. The decrypted profile information is stored temporarily in RAM of system 102 and erased (as is the key) immediately after a learning or proof phase completes. As another example, the key can be derivable (e.g., by system 102) from the pseudonym.

In some embodiments, the following approach is used to encrypt/decrypt profile information: The service provider (e.g., "Acme Bank") maps a username (e.g., "AliceJones") to a string that represents both a pseudonym and key (e.g., "ABCD12345678"). The string consists of two parts: an index PSA (e.g., "ABCD") for retrieval by system 102 of the correct profile, and a decryption key PSB (e.g., "12345678") for decryption of encrypted portions of the profile. When a password reset is initiated, the service provider looks up the string using the username of the requestor. The string does not need to be known by the user. The string is sent to the cloud service, which looks up the appropriate profile using PSA (returning an error code if there is no such record), then decrypts the profile and retrieves the user's classification information. In some embodiments the images (or other stimuli) are stored (either encrypted or unencrypted) in the user's profile. References to the stimuli can also be stored in the user's profile, with the actual stimuli being stored elsewhere. The key PSB need not be stored by system 102, and can be erased after an authentication session has completed.

Profile Comparisons

Two service providers (e.g., website 112 and online retailer 122) can compare their user databases without revealing to each other what users one has but the other does not. One approach is as follows. The service providers agree on a random key K that is used to hide content from system 102. The service providers then obfuscate all profiles on an item-wise basis, by applying a keyed hash function or other keyed one-way function to the items in the records. One such item is address, another is credit card number. It is assumed that some standardized format is used, e.g., for credit cards, all non-digits would be removed. Some items, such as address, can be decomposed into street name (e.g., "Oak Street") and zip code, and each hashed separately. Other items are normalized, e.g., "Oak Street" and "Oak St." are both mapped to "Oak St," "Oak," or "OakS." The username is broken up into first name, middle name, and last name. Additionally, initials can be extracted and hashed separately, e.g., "Jon" and "Jonathan" may both be mapped to "J." The result is a hashed profile of normalized and expanded items. The two service providers thus obtain a collection of hashed profiles, such as hash-profile1 and hash-profile2. Each item in the profile is tagged with what the data represents, e.g., "Name," "First name initial," "Street name," "PO Box number," "zip code," "area code," etc. The service providers send all such collections to be compared to system 102, who is assumed not to know K. System 102 can then determine the extent to which various profiles match. For example, a profile may match perfectly, or partially. Depending on the rules for what constitutes a match, i.e., the extent to which two profiles need to correspond to each other, a collection of profiles are identified as matching each other. System 102 communicates information about which items match each other; or the extent to which items in the list from a given service provider are matched by another from the other service providers.

Profiles can also be matched across more than two service providers. The service providers can then, given this list of overlaps, negotiate what users they wish to merge profiles for. (The profiles may be identified between the service providers by the hashed pseudonyms, or other identifiers, such as their position in the list of the records sent over.) The service providers can send a merge request to system 102 that contains the pseudonyms usable to identify the profiles at system 102. Once two or more records are identified to be matched, their data is decrypted, combined, and re-encrypted using a key, which may be the same as one of the previous keys, or duplicated, with each copy encrypted using the keys each pre-combined record was encrypted with. In the former case, one or more of the service providers is told about the new key to be used to access the record. Similarly, the index portion of the record can be duplicated or replaced by a new number. In some embodiments, system 102 is in charge of selecting the indices in order to avoid collisions. Alternatively, each service provider can select its own indices, which are then augmented with a descriptor of the service provider to make them unique.

Mobile Devices

As explained above, one example client device usable in conjunction with the techniques described herein is a mobile phone, such as mobile phone 116. An authentication process, such as is described in conjunction with FIG. 10, can be performed with respect to a variety of devices including mobile phone 116. As part of either the learning or the proof phase, the user can explicitly/actively provide identifying information to the service provider such as by providing a phone number, name, or credit card number. The identification of the user's account with the service provider can also be implicit/passive, such as by being based on caller ID. In some embodiments the service provider looks up the user's pseudonym based on the received information and sends it to system 102. System 102 uses the received pseudonym to access the corresponding profile, retrieve the appropriate stimuli for classification, and either send the stimuli directly to the user's phone or to the service provider which in turn provides it to the user's phone. The stimuli for classification can be presented to a user of phone 116 in a way that solicits a voice response, touch screen response, or other appropriate input mechanism, as applicable. For example, images can be displayed on the screen of the user device. Voice prompts can also be provided by voice interface, such as via a voice saying, "do you like skating?" The user makes selections/classifications, e.g., by pressing buttons, touching the screen, or providing voice feedback. The user's responses are interpreted by either the service provider or system 102, the latter of which compares the results of the user selection with the stored selections/classifications, computes a score and provides this or a fail/pass decision to the service provider. In various embodiments, system 102 additionally scores biometric aspects, such as the user's voice, and may add these to the profile.

Using "No Opinion" Items in Classification

When faced with 100 stimuli to classify (e.g., during a learning phase), suppose a given individual would ultimately select 15 items as "liked," 10 items as "not liked," and leave 75 items unclassified. In some embodiments, rather than asking the user to classify 20 or 25 items, the user is instead asked to select 5 likes and 5 dislikes. This can considerably speed up the enrollment/learning phase. Ten of the unselected items are designated as "no opinion" (although it is not known with certainty whether the designation is true or not) and stored alongside the likes and dislikes in the user's profile.

During a subsequent proof phase, the user is instructed to pick, from sixteen items, three items the user likes, pick three items the user doesn't like, and disregard the remaining items. Instead of performing a binary classification, a ternary classification is effectively performed.

It is possible that the user in fact has an opinion about one (or more) of the items designated by system 102 as a "no opinion" by the user may thus "erroneously" select one of the "no opinion" items as either a like or a dislike. The additional security provided by having a three-way classification at the proof phase can potentially offset one or more "erroneous" classifications. Further, even if a legitimate user fails to successfully pass the proof phase (e.g., due to the inclusion of "no opinion" items about which the user has a stronger preference than the ones the user actually selected), the user would likely prefer being slightly more inconvenienced at proof time (e.g., by having to also receive an email or an SMS or talk to a human to reset a password) in exchange for saving time at enrollment.

In various embodiments, knowledge about the user (e.g., based on demographic or other information stored in the user's profile at system 102 or provided by a service provider) is used to help select the likely no opinion items. For example, using the information shown in FIG. 5, "horses" are an example of a stimulus about which Bob is likely to have no opinion and thus would be a good selection in this scheme.

Presentation of Stimuli

In some embodiments during the learning phase, a matching collection of concepts are displayed or otherwise made available to the user, along with a description or visualization of the classification rules. For example, if the set is movies seen/not seen, it could be presented as titles, movie poster images, etc. For sounds it could be presented as sounds of nature (water running, wind through trees, thunder); of activities (soccer, ping pong, baseball, a tea ceremony, skiing) or objects (various types of engines, sounds of toys being used) or people and shows (famous actors, jingles), etc. Information can also be collected implicitly, by observing user behavior and actions. This information can later be used to automatically perform classifications to be added to the user's profile and to identify what information to acquire to obtain better classifications. The information can be acquired from the user or from third parties, or a combination thereof.

Disabling Stimuli

As explained above, in some embodiments system 102 is configured to attempt to select stimuli which are likely to be relevant to the user (i.e., about which the user is likely to have an opinion of some kind). In some embodiments the user is able to remove certain classes of stimuli. For example, if the user's browsing history suggests that he likes soccer, then it may be that soccer is preselected as a stimulus, and/or other stimulus related to soccer may be preselected. The selection may be inappropriate because, for example, the user may have temporarily loaned his computer to a friend who is enthusiastic about soccer while the user himself is not. The browsing patterns may be knowable for a variety of reasons: the collection of intelligence can be performed using an application, piece of software or browser plugin on the machine used by a particular person; it can also be performed by a search engine or common portal; by automated querying of the browser history or browser cache of the user's device, as is possible for some browser types; and any other appropriate technique. As another example, music preferences can be collected from a music playing application; from a website serving music, such as Pandora; from a website that sells music, such as site 122; the responses to offers received by email, SMS, or in website advertisements; by a crawler that identifies preferences expressed on social networking websites, on discussion forums, etc; or by correlation with observed facts in one of these or similar ways.

It could also be the case that the user has such strong opinions about soccer that an adversary would easily be able to glean the user's viewpoints through public channels. In such a scenario, score-related stimulus can be either not preselected, or can be prevented from being selected by the user as a category of stimulus. One way this could occur is as follows. Suppose social networking site 126 has contracted with system 102 to handle password reset requests and to handle login attempts where the IP address of the user is significantly different from previous IP addresses used by that user. Site 126 has access to both public and private postings made by the user and has access to information such as the user's favorite books, favorite music, and favorite movies. In some embodiments site 126 periodically evaluates each user's data to glean whether any of the stimuli classified by the user are also present in a meaningful way within that user's social networking profile (either publicly accessible or privately accessible). If a user's opinions with respect to such stimuli are available, site 126 can automatically request that system 102 remove them from the list of stimuli provided to the user for secondary authentication purposes. In some embodiments different thresholds are used in determining whether to disable a set of stimuli, such as having a lower threshold to disable information that is posted publicly, while having a higher threshold to disable information that is made available only to friends. In some embodiments, rather than disabling the set of stimuli entirely, the assurance provided by correct answers pertaining to the stimuli are discounted, requiring that more total questions be answered correctly.

Thresholds

As explained above, as part of the proof/authentication phase, the user is presented with a subset of the already classified stimuli, and asked to classify them. If a sufficient number of reclassifications are correct, or sufficiently correct in the case where there are degrees of correctness, then the user authentication is accepted as valid. The definition of "sufficient" may depend on the context, i.e., the application or physical environment that the user is requesting access to. It may also depend on past history in terms of authentication attempts and other information about the user and the threat situation. For example, a user who often succeeds at the authentication process very well may be treated differently than one who often succeeds with a marginal pass. The latter is known to make more errors. The threshold may be increased for the former, and there may be a lower tolerance for number of tries.

Use in Storage Devices

Suppose a hardware device, such as a consumer data storage device, protects data using encryption. The key may be generated from a password or other user-supplied credential. If the user forgets this, a reset is necessary. In some embodiments, the service provider is the manufacturer or the hardware device or an entity that otherwise sells password reset services or makes such services available to end users using system 102. In this scenario, system 102 does not need to know any information about the client or the storage device, other than the pseudonym (which can be kept by the service provider) and the answers to the reset questions (which can be kept by the user operator of the client device). System 102 can be used to manage the dispensal of the decryption keys, which can be made contingent on passing an authentication test. System 102 can keep statistics on the frequency of reset attempts to flag user accounts under attack. Further, different users can select different security levels and service providers can demand different security levels. System 102 can store the requirements as policies 110. In this example, all communications can be encrypted end-to-end, and that the service provider need not learn any keys, nor can an eavesdropper.

Additional Types of Data for Authentication

In addition to or instead of classifying stimuli as described above, other authentication techniques can be employed by system 102 in conjunction with providing cloud-based authentication services to service providers. As one example, when a user registers with site 128 and enrolls with system 102, the user can be prompted (e.g., within an iframe element or via another appropriate mechanism) to supply fingerprint, voiceprint, or other biometric information which is then stored with system 102 and associated with the user's profile. In the event the user needs to reset a password on service provider 128's site, instead of soliciting a text-based response (e.g., as illustrated in interface 950), data from the user's microphone or fingerprint reader can be provided to system 102. As with classification data, system 102 can compare the voiceprint (or other information) provided by the user to what was previously stored, determine a score, and provide an assessment to service provider 128 based on the score.

Additional Uses

A variety of uses of the technology described herein is presented above. Additional uses can also be made of the technology. For example, the techniques can be used to unlock or generate a value that is used to unlock a decryption key in a secured processor, where the key is used to decrypt the contents of storage units associated with this processor. The techniques can also be used to cause the unlock of the decryption key. It is possible to use the techniques described herein in conjunction with other transactions, such as decryption of contents, access to resources, or computation of otherwise obfuscated information. One can use the disclosed technology to authenticate to a device that locks parts of a system down to deter theft of data or services. One can also use it to gain access to changing configurations of devices, such as routers. User profiles can be copied from devices already in use to newly deployed devices, thereby limiting the extent to which users have to be engaged in setting up profiles; and limiting the need for observation and learning phases.

In addition to the entities illustrated in FIG. 1, other users of the technology described herein include health insurance and medical providers; email and online service providers; consumer devices, such as cameras, phones and computers; components of systems, such as processors, co-processors, and routers; medical components such as surgically implanted sensors and medication devices, pace makers, etc.; access control devices, such as car locks, ignition keys, house and office locks; and logging services that collect information about accesses, requests and traffic.

In one example embodiment, Alice starts using an online service provider. Sometime after establishing her account, she is asked to set up a profile that will allow her to reset her password. To do this, she chooses some number of classification rules through an interface to system 102 made accessible via the online service provider. In addition to the rules selected by Alice, the online service provider's system selects additional classification rules for her. For example, Alice chooses "Things that are funny/not funny" system 102 chooses on Alice's behalf the rule "Things I know how to do/do not know how to do." Next, Alice is shown a collection of images. She can drag each image to a portion of the screen that is labeled "Things I like" or another portion of the screen labeled "Things I do not like." In addition, she can pull the same items to a portion labeled "Things I know how to do" or a portion labeled "Things I do not know how to do." She can pull one item, such as an image of a soccer player kicking a ball, to both "Things I like," and "Things I do not know how to do," or some other combination, or to only one category. She can also avoid classifying this image. Alice is asked to classify some number of images in this way; these may be organized in directories and subdirectories. After she has classified a sufficient number of these, her profile is complete. If she wants to, she can classify an insufficient number at one time, and then return to continue classifying more at a later time. It is also possible for system 102 to observe her behavior or preferences and make preliminary classifications. In some embodiments Alice is asked to confirm these observations. In some embodiments the items that are made available to Alice to classify depends on her observed behavior, or on the observed behavior of other users. The latter may be used to avoid having a too large or too small number of users classify a given item, for example.

As another example scenario, suppose Alice has bought a new phone, and made some number of phone calls. Snippets of conversations from the people she called can be chosen and provided to Alice, after which she can classify the voices according to a rule, such as "I know this person well/I do not know this person well." System 102 can also select voice snippets from persons Alice calls numerous times and determine that Alice must know these people well, since she speaks to them so often. Similarly, system 102 can conclude that some other voices, for people Alice does not speak to often, correspond to people Alice does not know well. Some number of these inferences may be incorrect, but a large portion is likely to be correct. System 102 or another appropriate device stores the voice snippets and the corresponding classifications, along with information such as whether it was Alice who made the classification, or the system. This will be stored in Alice's profile, in which some identifier of hers, such as her phone number, may also be stored.

Assume now that Alice has forgotten her password to access some resource, such as a resource on the phone. This resource may be the address book, or the right to read emails sent to Alice. Alice then indicates this fact, and is provided with a list of icons that she can click, which plays the corresponding voice snippets. She is asked to select the icons that correspond to people she knows well. Alternatively, she may be asked to select the five for which she knows the corresponding people best. She makes this selection, and it is compared to the selection in her profile. If there is a sufficiently large agreement between these, then she is admitted to the resource. Note that it is not necessary to display icons. In an alternative embodiment of the authentication phase, Alice may simply be played some collection of voice snippets and be asked to say yes or press 1 if she knows the person reasonably well, or say no or press 0 if she does not. Here, the verifier may be a piece of software or hardware on Alice's phone. In various embodiments, enrollment of the snippets includes associating a name with the snippet and asking Alice to recall the person's name or other categorical information, such as "This is my barber" or "This is Bill" or "This is a relative" or "This is my father."

Determining Error Rates

Techniques for determining connections between error rates and the required number of images or other stimuli will now be described:

Assume a false positive rate of no more than 1% and a false negative of no more than 5%. In the following, the number of likes is varied, as are the number of dislikes, and the threshold associated with successful authentication.

1. Assume just one try is allowed and consider the false positives as a function of the threshold. Assume no mutual information and one bit of entropy per image.

a. Threshold 8 out of 8—false positive becomes 0.008%

Assume there are 16 images, and the user will select which ones he "likes" to authenticate. If any number (0 to 16) could belong to this group, and a requirement is made for all to be correct, then the probability of a correct guess would be $0.5^{16}$, or one in 65536. However, the adversary knows that exactly 8 are "likes." Therefore, the probability of success is 1/(16 choose 8) for threshold 8. This is 1/12760.

b. Threshold 7 out of 8—false positive becomes 0.07%

If a threshold of 7 is required, that means that the adversary has to choose 7 correct out of 16 and 1 incorrect out of the possible 8 choices for incorrect selections. There are 8/(16 choose 7) ways of doing this (where the nominator is (8 choose 1)). This is 1/1430—the probability of hitting the threshold exactly; therefore the probability of passing is 1/1430+1/12760. (This corresponds to the probability of getting 7 right, plus the probability of getting 8 right, which is the same as getting at least 7 right.)

c. Threshold 6 out of 8—false positive becomes 0.35%

For threshold 6, the probability of just hitting the threshold is (8 choose 2)/(16 choose 6)=28/8008=1/286. The probability of passing is 1/1430+1/12760.

2. Taking mutual information into consideration; using realistic entropy measurements.

Mutual information is the correlation between images. It is possible that a person who likes motorcycles is more likely to like rock music than a person who does not like motorcycles. Assume that the adversary knows all such statistic correlations and takes advantage of them. Suppose mutual information measured is approximately 0.1 bits per image. This means that the actual security is $x^{0.9}$, where x is the number above.

| This is~ | for threshold |
|---|---|
| 1/4967 | 8 |
| 1/628 | 7 |
| 1/135 | 6 |

This assumes that the entropy per image is one bit, which it is not. A better value for entropy is between 0.7 and 0.95. Suppose now that the previous probabilities are all raised to 0.825 (i.e., between 0.7 and 0.95).

| One gets~ | for threshold |
|---|---|
| $(1/4967)^{0.825}$ = 0.08% | 8 |
| $(1/628)^{0.825}$ = 0.5% | 7 |
| $(1/135)^{0.825}$ = 2% | 6 |

If a service provider wants a false positive of less than 1%, for example, that would rule out the threshold 6.

One reason to use lower entropies (as in the last step) is if it is believed that a typical attacker knows the entropies. This depends on the beliefs of the service provider. Practically speaking, the false positives will still be less than one percent, since realistic adversaries would not have the benefit of knowing all the correlations, and act accordingly. (Friends and family would know some facts about users, but are very bad adversaries, as regular users are highly unlikely to understand the perfect adversarial strategy.)

3. Giving the attacker two tries.

If the attacker has success probability x in one try, then he has success probability $1-(1-x)^2$ for two tries.

| One gets~ | for threshold |
|---|---|
| 0.2% | 8 |
| 1% | 7 |
| 4% | 6 |

4. Turning to false negatives.

Empirically, false positives plus false negatives can be constrained to less than 4%.

5. Considering cookies

If cookies are used to further authenticate users, or other contextual information such as machine identity or caller ID, then the error rates are affected. The above example thresholds assume a non-cookie setting. Lower thresholds can be used where a cookie is present. For example, suppose that a threshold of 7 out of 8 is used when a cookie is not present, and 6 out of 8 is used when a cookie is present. Suppose further that 80% of all legitimate users have cookies, and no attackers have them. This lowers the false negatives considerably (since it will lower the threshold for success for typical users), but it does not affect the false positives (since all attacks fall into the no-cookie case, which was covered above). Users with cookies can be shown fewer images. Thus, while they may have registered 8+8, as one example, they could be shown 5+5 images, and asked to select the five they like the best, using threshold 3.

6. Putting it all together

Suppose that cookies can be used, and that when no cookie is present, 8+8 are shown, with threshold 7. This gives a false positive against an optimal adversary of just below 1%, assuming two tries. The cookie-present users could be shown 5+5, and presented with a threshold of 3 and two tries. Alternatively, cookie-present users could be shown 8+8 with a threshold of 6, and offered a much larger number of tries.

As a second example, if 6+6 stimuli is used with a threshold of 5, here are example formulas for false positives:

(a) naive adversary who does not know distribution, and who gets one try: A=1/((2*6) choose 5)=1/792.

(b) competent adversary who knows distribution, assuming all images have entropy 0.8: $B=A^{0.8}$=0.00479755381.

(c) as (b) but not lower bound, but more realistic estimate: $C=A^{0.9}$=0.00246120244.

(d) as (b) but two tries: $D=1-(1-B)^2$=0.0095720911.

(e) as (c) but two tries: $E=1-(1-C)^2$=0.00491634736.

In various embodiments, service provider administrators are shown a graph that shows the false positives and false negatives, with pre-checked and pre-filled questions like "How many LIKEs during setup?" and "How many LIKES are the user shown during authentication?" and "How many DISLIKES does the user have to get right during authentication?" and "How many tries are allowed before an account gets locked?" The service provider can change the answers to these questions, after which the false positives and false negatives are recomputed. Alternatively, a graph can be shown for these values, where one of previously prefilled questions would be the value on the x-axis, helping a service provider determine an approximation of what number of stimuli they need. The same can be computed for particular images and particular known frequencies of selection, and correlations between such.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A cloud authentication system, comprising:
 a processor configured to:
  receive a request for authentication setup for a first user of a first service provider;
  generate a first set of stimuli to associate with a first user profile of the first user of the first service provider, wherein the first set of stimuli is generated based at least in part on at least one of (1) publicly accessible information associated with the first user and (2) information associated with the first user that is provided by the first service provider;
receive a first request to authenticate, on behalf of the first service provider, a first entity purporting to be the first user;
receive an indication of a perceived threat; and
determine, based at least in part on the perceived threat, whether a stimulus in the first set of stimuli should be presented to the entity purporting to be the first user for classification; and
a memory coupled to the processor and configured to the processor to provide the processor with instructions.

2. The cloud authentication system recited in claim 1 wherein the processor is configured to:
determine a type of the perceived threat; and
based at least in part on the type of the perceived threat, determine whether the stimulus should be presented for classification.

3. The cloud authentication system recited in claim 2 wherein the processor is further configured to determine the type of the perceived threat at least in part by reviewing at least one of (1) an IP address of an access, (2) a type of transaction requested, and (3) recent activity associated with the first user.

4. The cloud authentication system recited in claim 1 wherein the processor is configured to:
determine that the perceived threat is that the first user is being impersonated by malware; and
based at least in part on the determination that the perceived threat is that the first user is being impersonated by malware, determine that the stimulus should be presented for classification.

5. The cloud authentication system recited in claim 1 wherein the processor is configured to:
determine that the perceived threat is that the first user is being impersonated by an entity that is likely to know preferences of the first user; and
based at least in part on the determination that the perceived threat is that the first user is being impersonated by an entity that is likely to know preferences of the first user, determine that the stimulus should not be presented for classification.

6. The cloud authentication system recited in claim 1 wherein the processor is further configured to determine whether the stimulus should be presented for classification based at least in part on a first set of policies associated with the first service provider.

7. The cloud authentication system recited in claim 6 wherein the first set of policies is provided to the cloud authentication system by the first service provider.

8. The cloud authentication system recited in claim 1 wherein the processor is further configured to:
receive a second request to authenticate, on behalf of a second service provider different from the first service provider, a second entity purporting to be a second user; and
in response to the second request to authenticate, select at least some stimuli in a second set of stimuli to be presented to the entity purporting to be the second user, wherein the at least some stimuli in the second set of stimuli are selected based at least in part on a second set of policies associated with the second service provider.

9. The cloud authentication system recited in claim 1 wherein the processor is configured to obtain the publicly accessible information associated with the first user at least in part by scraping a website.

10. The cloud authentication system recited in claim 1 wherein the processor is further configured to:
obtain information associated with the first user via an agent on a client associated with the first user; and
use the information obtained via the agent to generate at least a portion of the first set of stimuli.

11. A method, comprising:
receiving a request for authentication setup for a first user of a first service provider;
generating a first set of stimuli to associate with a first user profile of the first user of the first service provider, wherein the first set of stimuli is generated based at least in part on at least one of (1) publicly accessible information associated with the first user and (2) information associated with the first user that is provided by the first service provider;
receiving a first request to authenticate, on behalf of the first service provider, a first entity purporting to be the first user;
receiving an indication of a perceived threat; and
determining, based at least in part on the perceived threat, whether a stimulus in the first set of stimuli should be presented to the entity purporting to be the first user for classification.

12. The method of claim 11, comprising:
determining a type of the perceived threat; and
based at least in part on the type of the perceived threat, determining whether the stimulus should be presented for classification.

13. The method of claim 12, comprising determining the type of the perceived threat at least in part by reviewing at least one of (1) an IP address of an access, (2) a type of transaction requested, and (3) recent activity associated with the first user.

14. The method of claim 11, comprising:
determining that the perceived threat is that the first user is being impersonated by malware; and
based at least in part on the determination that the perceived threat is that the first user is being impersonated by malware, determining that the stimulus should be presented for classification.

15. The method of claim 11, comprising:
determining that the perceived threat is that the first user is being impersonated by an entity that is likely to know preferences of the first user; and
based at least in part on the determination that the perceived threat is that the first user is being impersonated by an entity that is likely to know preferences of the first user, determining that the stimulus should not be presented for classification.

16. The method of claim 11, further comprising determining whether the stimulus should be presented for classification based at least in part on a first set of policies associated with the first service provider.

17. The method of claim 16 wherein the first set of policies is provided to a cloud authentication system by the first service provider.

18. The method of claim 11, further comprising:
receiving a second request to authenticate, on behalf of a second service provider different from the first service provider, a second entity purporting to be a second user; and
in response to the second request to authenticate, selecting at least some stimuli in a second set of stimuli to be presented to the entity purporting to be the second user, wherein the at least some stimuli in the second set of stimuli are selected based at least in part on a second set of policies associated with the second service provider.

19. The method of claim 11, comprising obtaining the publicly accessible information associated with the first user at least in part by scraping a website.

20. The method of claim 11, further comprising:
   obtaining information associated with the first user via an agent on a client associated with the first user; and
   using the information obtained via the agent to generate at least a portion of the first set of stimuli.

21. A computer program product embodied in a tangible, non-transitory computer readable storage medium and comprising computer instructions for:
   receiving a request for authentication setup for a first user of a first service provider;
   generating a first set of stimuli to associate with a first user profile of the first user of the first service provider, wherein the first set of stimuli is generated based at least in part on at least one of (1) publicly accessible information associated with the first user and (2) information associated with the first user that is provided by the first service provider;
   receiving a first request to authenticate, on behalf of the first service provider, a first entity purporting to be the first user;
   receiving an indication of a perceived threat; and
   determining, based at least in part on the perceived threat, whether a stimulus in the first set of stimuli should be presented to the entity purporting to be the first user for classification.

* * * * *

UNITED STATES PATENT AND TRADEMARK OFFICE
CERTIFICATE OF CORRECTION

| | | |
|---|---|---|
| PATENT NO. | : 11,075,899 B2 | Page 1 of 2 |
| APPLICATION NO. | : 16/394279 | |
| DATED | : July 27, 2021 | |
| INVENTOR(S) | : Bjorn Markus Jakobsson | |

It is certified that error appears in the above-identified patent and that said Letters Patent is hereby corrected as shown below:

In the Specification

In Column 1, Line(s) 6, before "U.S.", insert --co-pending--.

In Column 20, Line(s) 56, after "polynomial", delete "f(x)" and insert --f'(x)--, therefor.

In Column 20, Line(s) 58, after "Here,", delete "f(x)" and insert --f'(x)--, therefor.

In Column 20, Line(s) 64, after "from", delete "f(x)" and insert --f'(x)--, therefor.

In Column 20, Line(s) 65, delete "f(x)." and insert --f'(x).--, therefor.

In Column 20, Line(s) 65, after "and", delete "f(x)" and insert --f'(x)--, therefor.

In the Claims

In Column 33, Line(s) 16, Claim 2, after "claim 1", insert --,--.

In Column 33, Line(s) 22, Claim 3, after "claim 2", insert --,--.

In Column 33, Line(s) 28, Claim 4, after "claim 1", insert --,--.

In Column 33, Line(s) 36, Claim 5, after "claim 1", insert --,--.

In Column 33, Line(s) 46, Claim 6, after "claim 1", insert --,--.

In Column 33, Line(s) 51, Claim 7, after "claim 6", insert --,--.

In Column 33, Line(s) 54, Claim 8, after "claim 1", insert --,--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,075,899 B2

In Column 33, Line(s) 66, Claim 9, after "claim 1", insert --,--.

In Column 34, Line(s) 3, Claim 10, after "claim 1", insert --,--.

In Column 34, Line(s) 57, Claim 17, after "claim 16", insert --,--.